United States Patent
Heimbuch

(10) Patent No.: US 10,355,783 B2
(45) Date of Patent: Jul. 16, 2019

(54) OPTICAL-TO-OPTICAL TRANSCEIVER AND METHODS OF MAKING AND USING THE SAME

(71) Applicant: Source Photonics (Chengdu) Do., Ltd., Chengdu (CN)

(72) Inventor: Mark Heimbuch, West Hills, CA (US)

(73) Assignee: Source Photonics (Chengdu) Co., Ltd., Chengdu (CN)

(*) Notice: Subject to any disclaimer, the term of this patent is extended or adjusted under 35 U.S.C. 154(b) by 269 days.

(21) Appl. No.: 15/119,080

(22) PCT Filed: Aug. 3, 2016

(86) PCT No.: PCT/CN2016/093132
§ 371 (c)(1),
(2) Date: Aug. 15, 2016

(87) PCT Pub. No.: WO2018/010232
PCT Pub. Date: Jan. 18, 2018

(65) Prior Publication Data
US 2018/0248630 A1    Aug. 30, 2018

Related U.S. Application Data

(60) Provisional application No. 62/360,646, filed on Jul. 11, 2016.

(51) Int. Cl.
*H04B 10/40* (2013.01)
*G02B 6/12* (2006.01)
(Continued)

(52) U.S. Cl.
CPC ............ *H04B 10/40* (2013.01); *G02B 6/122* (2013.01); *G02B 6/12007* (2013.01);
(Continued)

(58) Field of Classification Search
CPC combination set(s) only.
See application file for complete search history.

(56) References Cited

U.S. PATENT DOCUMENTS

| 6,580,531 B1 | 6/2003 | Swanson et al. |
| 9,628,195 B2 | 4/2017 | Jiang et al. |

(Continued)

FOREIGN PATENT DOCUMENTS

| CN | 1467934 A | 1/2004 |
| CN | 101635597 A | 1/2010 |

(Continued)

OTHER PUBLICATIONS

Office Action dated May 21, 2018; Chinese Patent Application No. 201610953904; 9 pgs.; The State Intellectual Property Office of the P.R.C., People's Republic of China.
(Continued)

*Primary Examiner* — David C Payne
*Assistant Examiner* — Omar S Ismail
(74) *Attorney, Agent, or Firm* — Andrew D. Fortney; Central California IP Group, P.C.

(57) ABSTRACT

An optical-to-optical (O2O) signal path, O2O and hybrid transceivers including the same, a network system or device including one or more of the transceivers, and methods of making and using the same are disclosed. The O2O signal path generally includes first and second ports and an optical amplifier configured to receive an optical signal from a host or a network through the first port and provide an amplified optical signal for the other of the host and the network through the second port. In some examples, the O2O signal path further includes one or more optical isolators and/or clock and data recovery functions. The optical signals in the O2O signal path are processed entirely in the optical domain. The transceiver includes the O2O signal path and
(Continued)

may include an optoelectronic signal path, a pass-through connector, or a second O2O signal path.

37 Claims, 8 Drawing Sheets

(51) Int. Cl.
G02B 6/42 (2006.01)
H04B 10/29 (2013.01)
G02B 6/122 (2006.01)

(52) U.S. Cl.
CPC ......... *G02B 6/4214* (2013.01); *G02B 6/4246* (2013.01); *G02B 6/4292* (2013.01); *H04B 10/29* (2013.01)

(56) References Cited

U.S. PATENT DOCUMENTS

| | | | | |
|---|---|---|---|---|
| 9,882,634 | B1* | 1/2018 | Al Sayeed | H04B 10/035 |
| 2005/0089281 | A1* | 4/2005 | Chiu | G02B 6/4201 |
| | | | | 385/92 |
| 2007/0133987 | A1* | 6/2007 | Xu | H04B 10/40 |
| | | | | 398/67 |
| 2008/0181615 | A1* | 7/2008 | Atieh | H04B 10/25133 |
| | | | | 398/147 |
| 2008/0240725 | A1* | 10/2008 | Yokoyama | H04B 10/40 |
| | | | | 398/139 |
| 2011/0249947 | A1* | 10/2011 | Wang | G02B 6/3817 |
| | | | | 385/89 |
| 2013/0223848 | A1* | 8/2013 | Yuda | H04B 10/40 |
| | | | | 398/135 |
| 2015/0168803 | A1* | 6/2015 | Xu | G02F 1/353 |
| | | | | 359/332 |
| 2015/0295656 | A1* | 10/2015 | Ono | H04B 10/00 |
| | | | | 398/178 |
| 2015/0311976 | A1* | 10/2015 | Ishizaka | H04B 10/2503 |
| | | | | 398/38 |
| 2016/0105240 | A1* | 4/2016 | Yang | G02B 6/4246 |
| | | | | 398/68 |
| 2016/0268981 | A1 | 9/2016 | Jiang et al. | |

FOREIGN PATENT DOCUMENTS

| | | |
|---|---|---|
| CN | 104125517 A | 10/2014 |
| CN | 104508977 A | 4/2015 |
| CN | 105577285 A | 5/2016 |
| WO | 2013078679 A1 | 6/2013 |

OTHER PUBLICATIONS

Jiang Xu et al; "TIA with Increased Dynamic Range and Optical Device Thereof"; Bibliographic Data of CN104508977 (A); Apr. 8, 2015; http://worldwide.espacenet.com.

Xu Zhiguang; "Method for Lowering Noise of Optical Amplifier, Optical Access Equipment and Optical Network System"; Bibliographic Data of CN101635597 (A); Jan. 27, 2010; http://worldwide.espacenet.com.

Zhu Quangen; "Bi-directional Wavelength Optical Function Module"; Bibliographic Data of CN1467934 (A); Jan. 14, 2004; http://worldwide.espacenet.com.

Li Kunji et al; "Optical Module"; Bibliographic Data of CN105577285 (A); May 11, 2016; http://worldwide.espacenet.com.

Zhang Xifang et al; "Light Transmission System, Mode Coupler and Light Transmission Method"; Bibliographic Data of CN104125517 (A); Oct. 29, 2014; http://worldwide.espacenet.com.

Zhou Xiaoping et al; "Optical Transceiver Module, Passive Optical Network System and Apparatus"; Bibliographic Data of WO2013078679 (A1); Jan. 6, 2013; http://worldwide.espacenet.com.

International Search Report and Written Opinion; PCT International Searching Authority/CN dated Apr. 10, 2017; International Application No. PCT/CN2016/093132; 9 pages; International Searching Authority/China, State Intellectual Property Office of the People's Republic of China, Beijing, China.

* cited by examiner

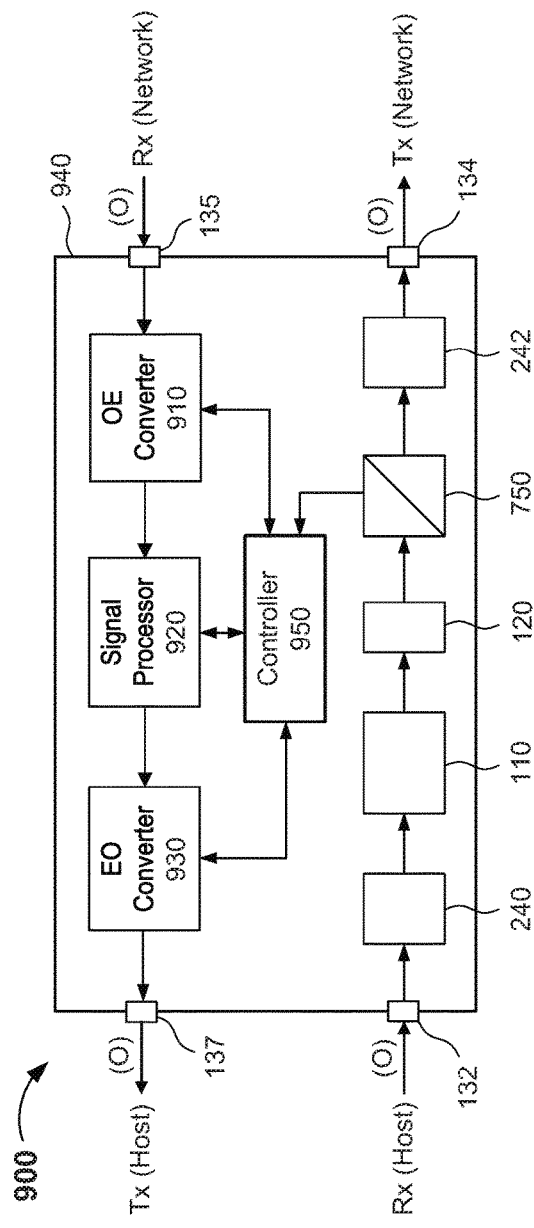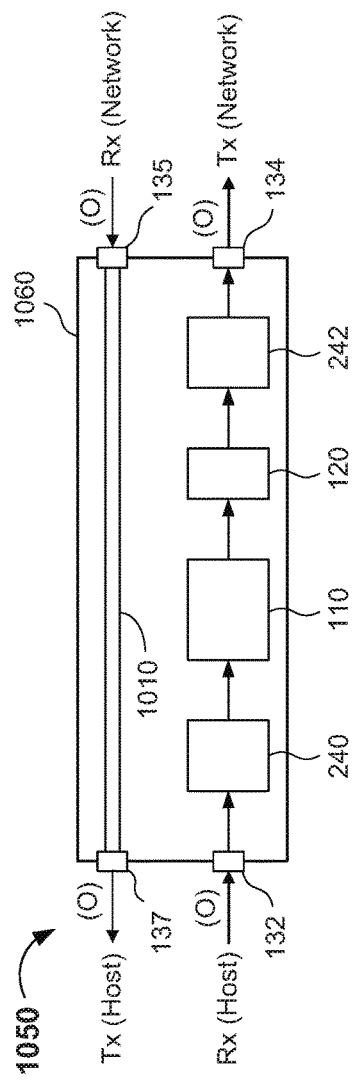

OPTICAL-TO-OPTICAL TRANSCEIVER AND METHODS OF MAKING AND USING THE SAME

RELATED APPLICATION(S)

The present application is a national phase application of International Application No. PCT/CN2016/093132, filed Aug. 3, 2016, which claims priority to U.S. Provisional Pat. Appl. No. 62/360,646, filed Jul. 11, 2016.

FIELD OF THE INVENTION

The present invention generally relates to the field of optical transceivers. More specifically, embodiments of the present invention pertain to transceivers capable of receiving and/or transmitting optical data signals bidirectionally, optical network equipment (such as optical switches and large-scale data storage and/or transmission devices) including the same, and methods of making and using the same.

DISCUSSION OF THE BACKGROUND

There is an increasing need for network and communication bandwidth. Optical networks have been developed to enable network operation at increased bandwidth and speed, as optical signals are capable of traveling farther than electrical signals at the data rates required by modern day networks.

Although data is transported optically in optical networks over optical fibers, the data is still processed primarily in the electrical domain in network devices such as data center switches and servers, optical network units (ONUs), optical network terminals (ONTs), optical line terminals (OLTs), and the like. This creates the requirement for electrical to optical conversion of data, which is an important purpose of optical transceivers or optical modules. For example, FIG. 1 shows an optoelectronic transceiver 10 that receives electrical signals from a host (e.g., through a port Rx [Host]), converts the received electrical signals to optical signals, and transmits the optical signals to a network (e.g., through a port Tx [Network]), and that receives optical signals from the network (e.g., through a port Rx [Network]), and that converts the received optical signals to electrical signals, and transmits the electrical signals to the host (e.g., through a port Tx [Host]). Thus, in networks, network devices that use devices such as the optoelectronic transceiver 10, data is processed in electrical circuits but transmitted over the network in the optical domain, allowing for longer transmission distances. As Integrated Circuits (ICs) continue to improve in their switching capacity, even the electrical Input/Output (I/O) pins or pads of the IC can become a limiting factor for the IC performance. Future generations of ICs are preparing to use optical I/O ports instead of electrical I/O ports to address this problem. These optical I/O ports will likely have small optical link budgets that may be capable of addressing only shorter distance network applications, thereby not servicing the full needs of the optical network.

One possible solution to this problem is a pluggable optoelectronic module that includes first and second optical-electrical-optical (OEO) converters. One OEO converter converts optical signals from the network to optical signals for the host, and the other OEO converter converts optical signals from the host to optical signals for the network. Each OEO converter includes a number of optical receivers configured to convert optical signals to electrical signals, electrical signal processing circuitry communicatively coupled to the optical receivers, and a number of optical transmitters configured to receive electrical signals from the signal processing circuitry and to convert the electrical signals to optical signals. This allows for conversion of a low-link-budget optical link to a high-link-budget optical link, permitting longer transmission distances that many network links require. However, the electrical signal processing circuitry in the inbound and outbound data transmission paths operates in the electrical domain, and thus increases the transceiver complexity and power consumption associated with requiring electrical circuitry in the OEO converter.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to a transceiver including an optical-to-optical (O2O) signal path, optical network equipment including the same, and methods for making and using the same. The present transceiver generally comprises a receiver, a transmitter and a housing. At least one of the receiver and the transmitter comprises an optical-to-optical signal path comprising first and second ports and a first optical amplifier configured to receive a first optical signal from one of a host and a network through the first port and provide a first amplified optical signal for the other of the host and the network through the second port. One purpose of the amplifier section is to increase the optical link budget, allowing for longer transmission distances than would otherwise be possible. The housing is configured to contain the receiver and the transmitter, including the first and second ports. The optical signals in the O2O signal path are processed entirely in the optical domain.

In some embodiments, the O2O signal path further comprises a first optical filter configured to filter a first amplified optical signal from the first optical amplifier and/or a first optical isolator configured to optically isolate the first amplified optical signal and provide the optically isolated first amplified optical signal to the other of the host and the network. Alternatively or additionally, the O2O signal path may further comprise a second optical isolator configured to (i) optically isolate the first optical signal from the host or the network and (ii) provide the optically isolated first optical signal to the first optical amplifier.

In further embodiments, the O2O signal path may further comprise a first optical clock recovery unit configured to recover a first optical clock signal from the first optical signal, the first amplified optical signal, or a portion thereof. In some such embodiments, the O2O signal path may further comprise a first optical gate configured to (i) receive the first optical clock signal and the first amplified optical signal and (ii) output the first optical clock signal or the first amplified optical signal in response to a first select signal. Alternatively or additionally, the O2O signal path may further comprise a first beam splitter configured to direct a portion of the first optical signal or the first amplified optical signal to the first optical clock recovery unit.

In various embodiments, the transceiver may be purely optical-to-optical, in which all data signals are processed in the optical domain, or hybrid. Such hybrid transceivers include one O2O signal path and an optoelectronic signal path. Pure O2O transceivers may include a pass-through connector or a second O2O signal path.

When the transceiver includes the second O2O signal path, the second O2O signal path may comprise a second optical amplifier configured to receive a third optical signal from the other of the host and the network. When the receiver comprises the (first) O2O signal path, the first optical amplifier receives the first optical signal from the host, and the transmitter (which comprises the second O2O signal path) receives the third optical signal from the network.

In embodiments including a second O2O signal path, the second O2O signal path may further comprise a second optical filter configured to filter a second amplified optical signal from the second optical amplifier, a third optical isolator configured to optically isolate the third optical signal from the other of the host and the network and provide the optically isolated third optical signal to the second optical amplifier, and/or a fourth optical isolator configured to optically isolate the second amplified optical signal and provide the optically isolated second amplified optical signal to the one of the host and the network.

Similar to the (first) O2O signal path, the second O2O signal path may further comprise a second optical clock recovery unit configured to recover a second optical clock signal from the third optical signal or the second amplified optical signal, in which case the second O2O signal path may further comprise a second beam splitter configured to direct a portion of the third optical signal or the second amplified optical signal to the second optical clock recovery unit. In such embodiments, the second O2O signal path may further comprise a second optical gate configured to (i) receive the second optical clock signal and the second amplified optical signal, and (ii) output the second optical clock signal or the second amplified optical signal in response to a second select signal.

When one of the receiver and the transmitter comprises the optical-to-optical signal path, the other of the receiver and the transmitter may comprise an optoelectronic signal path configured to receive an input signal from the other of the host or the network through a third port and provide an output signal to the host or the network through a fourth port. The optoelectronic signal path may be an optical-to-electrical, electrical-to-optical, or optical-to-electrical-to-optical signal path. The input signal may be electrical or optical. The output signal is optical when the input signal is electrical, and is optical or electrical when the input signal is optical.

In certain embodiments of the transceiver, the receiver comprises the O2O signal path, and the transmitter comprises an electrical-to-optical signal path. In such embodiments, the first optical amplifier receives the first optical signal from the network through the first port, and the electrical-to-optical signal path includes (i) a driver configured to receive an electrical input signal from the host through the third port and provide a driving signal to a transmitter optical subassembly (TOSA), and (ii) a laser in the TOSA configured to output an optical output signal to the network through the fourth port.

Alternatively, the transmitter comprises the O2O signal path, and the receiver comprises an optical-to-electrical signal path. The first optical amplifier receives the first optical signal from the host through the first port, and the optical-to-electrical signal path includes (i) a photodiode configured to convert the optical input signal from the network to a second electrical signal and (ii) an amplifier configured to amplify the second electrical signal and output the electrical output signal to the host through the fourth port.

In further alternative embodiments of the hybrid transceiver, one of the receiver and the transmitter comprises the O2O signal path and the other of the receiver and the transmitter comprises an optical-to-electrical-to-optical signal path configured to receive an optical input signal from the other of the host or the network through the third port and provide an optical output signal to the host or the network through a fourth port. For example, the receiver may comprise the O2O signal path and the transmitter may comprise the optical-to-electrical-to-optical signal path, or vice versa.

When the receiver comprises the O2O signal path, the first optical amplifier receives the first optical signal from the network through the first port, and the transmitter comprises (i) an optical-to-electrical converter configured to receive the optical input signal from the host through the third port, (ii) a signal processor configured to process an electrical data signal from the optical-to-electrical converter, and (iii) an electrical-to-optical converter configured to convert the electrical data signal to the optical output signal. Alternatively, when the transmitter comprises the O2O signal path, the first optical amplifier receives the first optical signal from the host through the first port, and the receiver comprises (i) an optical-to-electrical converter configured to receive the optical input signal from the network through the third port, (ii) a signal processor configured to process the electrical data signal from the optical-to-electrical converter, and (ii) an electrical-to-optical converter configured to convert the electrical data signal to the optical output signal.

In alternative O2O transceivers, one of the receiver and the transmitter may comprise the O2O signal path, and the other of the receiver and the transmitter may comprise a pass-through connector configured to receive the third optical signal from the other of the host or the network through a third port and provide the third optical signal to the host or the network through a fourth port. When the receiver comprises the pass-through connector, the third optical signal is received from the network, and when the transmitter comprises the pass-through connector, the third optical signal is received from the host. The content of the third optical signal is not modified by the pass-through connector, although the pass-through connector may focus or reflect the third optical signal.

In a further aspect, the present invention relates to an network system or device, comprising a plurality of the present transceivers, one or more controllers configured to monitor and/or control operations of the transceivers, a memory configured to store (i) instructions and/or commands for the controller and/or (ii) information and/or data from the transceivers, and a housing configured to secure the transceivers in place and enclose and/or protect the controller(s) and the memory/or a clock device configured to generate one or more timing signals for controlling the timing of various operations in the network system or device. The housing may have at least one opening therein configured to allow an optical fiber and/or an optical waveguide to pass from a host port in each of the transceivers to the host. In some embodiments, the network system or device is in a data center.

In an even further aspect, the present invention relates to a method of processing an optical signal, comprising receiving the optical signal in an optical-to-optical signal path in an optical or optoelectronic transceiver, amplifying the optical signal, and transmitting the amplified optical signal. The optical signal is from either a host or a network, and the amplified optical signal is transmitted to the other of the host and the network. In some embodiments, the method further comprises filtering the amplified optical signal, and transmitting the filtered, amplified optical signal to the other of the host and the network. In many embodiments, the method comprises receiving a first optical signal from a host and transmitting the amplified first optical signal (which may be filtered) to a network, and receiving a second optical signal from the network and transmitting the amplified second optical signal (which may be filtered) to the host.

In some embodiments, the method may further comprise optically isolating the optical signal after receiving the optical signal and prior to amplifying the optical signal. Alternatively or additionally, the optical signal may be optically isolated prior to transmitting the amplified optical signal and optionally after filtering the amplified optical signal. Such optical isolation operations can be performed on the optical signals from the host and/or the network.

In further embodiments, the method may further comprise splitting or separating a portion of the optical signal, recovering an optical clock signal from the portion of the optical signal, and optionally transmitting the optical clock signal instead of the amplified optical signal based on a value of the optical signal. The portion of the optical signal is split or separated prior to amplifying the optical signal. Such beam splitting, clock recovery and/or optical output signal selection operations can also be performed on the optical signals from the host and/or the network.

In a still further aspect, the present invention relates to a method of manufacturing a transceiver having an optical-to-optical signal path. The method comprises mounting, affixing or securing (hereinafter "securing") first and second ports to a housing of the transceiver, and securing a first optical amplifier to a first internal surface of the transceiver. A path from the first port to the second port defines the optical-to-optical signal path, and first internal surface is along the optical-to-optical signal path. The first port is configured to receive a first optical signal from one of a host and a network, the first optical amplifier is configured to amplify the first optical signal, and the second port is configured to provide the amplified first optical signal to the other of the host and the network.

In further embodiments, the method further comprises securing a first optical filter to a second internal surface along the O2O signal path. The first optical filter is configured to filter the amplified first optical signal from the first optical amplifier. Further embodiments of the method may comprise securing a second optical amplifier to a third internal surface of along a second optical-to-optical signal path of the transceiver, and securing a second optical filter to a fourth internal surface along the second optical-to-optical signal path. The second optical amplifier is configured to amplify a second optical signal from the other of the host and the network. The second optical filter is configured to filter the amplified second optical signal from the second optical amplifier. The second optical signal is received through a third port of the transceiver, and the amplified (or filtered and amplified) second optical signal is transmitted through a fourth port of the transceiver. The third and fourth ports define a second O2O signal path in the transceiver.

In some embodiments, the method may further comprise securing a first isolator to a fifth internal surface of the transceiver along the O2O signal path, securing a second isolator to a sixth internal surface of the transceiver along the O2O signal path, securing a third isolator to a seventh internal surface of the transceiver along the second O2O signal path, and/or securing a fourth isolator to an eighth internal surface of the transceiver along the second O2O signal path. The first isolator is configured to optically isolate the first optical signal prior to the first optical amplifier amplifying the first optical signal. The second isolator is configured to optically isolate the amplified (or the filtered and amplified) first optical signal. The third isolator is configured to isolate the second optical signal prior to the second optical amplifier amplifying the second optical signal. The second isolator is configured to optically isolate the amplified (or the filtered and amplified) second optical signal.

In additional or alternative embodiments, the method may further comprise securing a first beam splitter to a ninth internal surface of the transceiver along the O2O signal path, securing a first optical clock recovery unit to a tenth internal surface of the transceiver, and securing a first optical gate to an eleventh internal surface of the transceiver along the O2O signal path. The first beam splitter is configured to split or separate a portion of the first optical signal prior to the first optical amplifier amplifying the first optical signal. The first optical clock recovery unit is configured to recover a first optical clock signal from the portion of the first optical signal. The first optical gate is configured to select a first optical output signal from the first optical clock signal or the amplified (or the filtered and amplified) first optical signal based on a value of the first optical signal. In a further embodiment, the method may further comprise securing a second beam splitter to a twelfth internal surface of the transceiver along the second O2O signal path, securing a second optical clock recovery unit to a thirteenth internal surface of the transceiver, and/or securing a second optical gate to a fourteenth internal surface of the transceiver along the second O2O signal path. The second beam splitter is configured to split or separate a portion of the second optical signal prior to the second optical amplifier amplifying the second optical signal. The second optical clock recovery unit is configured to recover a second optical clock signal from the portion of the second optical signal. The second optical gate is configured to select a second optical output signal from the second optical clock signal or the amplified (or the filtered and amplified) second optical signal based on a value of the second optical signal.

The method of manufacturing may result in a hybrid O2O and optoelectronic transceiver, in which case the method further comprises mounting, affixing or securing one or more components of an optoelectronic signal path between third and fourth ports of the transceiver. A first component of the optoelectronic signal path is configured to receive an input signal from the other of the host or the network through the third port, and a second component of the optoelectronic signal path is configured to provide an output signal to the host or the network through the fourth port.

Alternatively, the method may further comprise mounting, affixing or securing a pass-through connector configured to receive the third optical signal from the other of the host or the network through a third port of the transceiver and provide the third optical signal to the host or the network through a fourth port of the transceiver.

The present invention enables signal processing and transfer between host devices and network system or devices in a data center network completely in the optical domain. This increases signal transmission rates through the transceivers that perform such signal processing and transfers, thereby increasing bandwidth in such optical networks, reducing power consumed and heat generated, and possibly reducing the number of components in such transceivers. The present invention can also be used in a fiber-to-the-premises (FTTP), fiber-to-the-home (FTTH), or other passive optical network (PON). These and other advantages of the present invention will become readily apparent from the detailed description of various embodiments below.

BRIEF DESCRIPTION OF THE DRAWINGS

FIGS. 9-10 are block diagrams showing other exemplary hybrid O2O and optoelectronic transceivers in accordance with embodiments of the present invention.

FIGS. 11A-B are block diagrams showing further exemplary O2O transceivers having a pass-through connector in accordance with embodiments of the present invention.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components and circuits have not been described in detail so as not to unnecessarily obscure aspects of the present invention.

For the sake of convenience and simplicity, the terms "transceiver" and "optical transceiver" may be used interchangeably, as may the terms "connected to," "coupled with," "coupled to," and "in communication with" (which include both direct and indirect connections, couplings and communications), the terms "mounting," "affixing" and "securing," and the terms "data," "information" and "bit(s)," but these terms are generally given their art-recognized meanings.

The invention, in its various aspects, will be explained in greater detail below with regard to exemplary embodiments.

Exemplary Optical-to-Optical Transceivers

Figure 2:
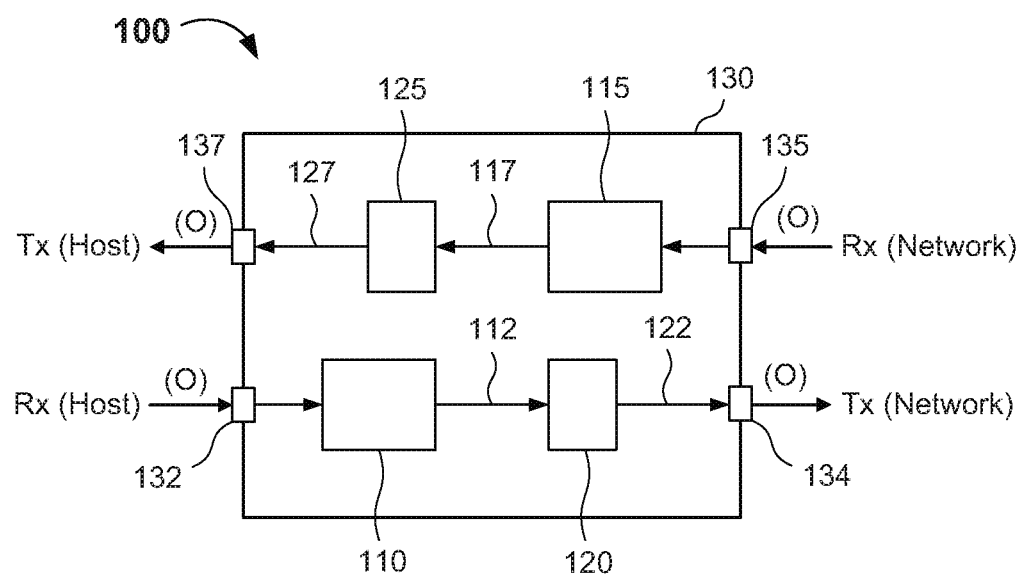
FIG. 2 is a block diagram showing an exemplary optical-to-optical (O2O) transceiver in accordance with one or more embodiments of the present invention.

FIG. 2 shows a first exemplary optical-to-optical (O2O) transceiver 100, including a first optical amplifier 110, a first optical filter 120, a second optical amplifier 115, a second optical filter 125, and a housing 130. The O2O transceiver 100 may further comprise first and second host-side ports 132 and 137, and first and second network-side ports 134 and 135. The first host-side port 132, first optical amplifier 110, first optical filter 120 and first network-side port 134 may form or define a transmitter optical path, and the second network-side port 135, second optical amplifier 115, second optical filter 125 and second host-side port 137 may form or define a receiver optical path.

The first optical amplifier 110 is configured to receive an optical signal from a host through the first host-side port 132. The optical signal may be transmitted over a conventional optical fiber, and may comprise a single optical signal (which may be a single-mode or multi-mode signal, but which is typically a single-mode signal at rates in the range of 50 Gbps-1 Tbps) or a plurality of multiplexed optical signals, such as four or more wavelength division multiplexed (WDM) optical signals. The port 132 may comprise a conventional connector for the optical fiber, such as a conventional EC, FC, LC or SC connector. Alternatively, the first and second host-side ports 132 and 137 together may comprise a conventional FJ, FDDI, MPO/MTP or SC-DC connector (e.g., for two or more optical fibers). In further alternative embodiments, the first and second host-side ports 132 and 137 may be combined into a single port/connector for a single single-mode or multi-mode fiber, in which case the port/O2O transceiver further comprises a beam splitter configured to reflect either the incoming or outgoing optical signals and allow the other of the incoming or outgoing optical signals to pass through. There may be one or more lenses at or proximate to the port 132, within the housing 130 and configured to focus the optical signal received from the host onto the optical amplifier 110, and/or to collimate or polarize the optical signal received from the host.

In various embodiments, the first optical amplifier 110 comprises a semiconductor optical amplifier (SOA), such as a vertical cavity SOA or an edge coupled SOA. The semiconductor optical amplifier may comprise a structure identical or substantially identical to that of a laser diode, but with one or more anti-reflective coatings and/or angled wave guide and/or window regions to reduce the end face reflection of the laser diode or laser diode-like structure to a negligible amount (e.g., <0.1%, 0.01%, or any other value <0.1%). The anti-reflective coating(s), angled wave guide and/or angled window region(s) create a loss of power from the laser diode or laser diode-like structure which is greater than the gain, thereby preventing the optical amplifier from acting as a laser. Thus, the first optical amplifier 110 may comprise a plurality of Group III-V or II-VI compound semiconductor layers, such as GaAs/AlGaAs, InP/InGaAs, InP/InGaAsP, InP/InAlGaAs, one or more of which is doped with a conventional n-type or p-type dopant, and optionally, one or more of which may be undoped. Furthermore, the semiconductor optical amplifier 110 may be electrically pumped, may provide one or more nonlinear operations, such cross gain modulation, cross phase modulation, wavelength conversion, four wave mixing and/or variable or different gains in different wavelength regions of the optical signal. Thus, in one embodiment, the first optical amplifier 110 may convert one or more wavelengths of the optical signal from the host to different wavelengths for transmission to the network.

In some cases, the first optical amplifier 110 may introduce out-of-band noise into the amplified optical signal 112. Consequently, the first optical filter 120 is configured to filter the amplified optical signal 112 from the first optical amplifier 110 and provide a filtered, amplified optical signal 122 to the network through the first network-side port 134. The filter 120 may simply remove the out-of-band noise from the amplified optical signal 112, or remove the out-of-band noise and one or more other components from the amplified optical signal 112. In various embodiments, the filter 120 comprises an optical bandpass filter (e.g., configured to allow light having a wavelength or frequency within a predetermined range to pass through, but block, remove or reject light outside the range), an optical longpass or lowpass filter (e.g., configured to block, remove or reject light having a wavelength above or frequency below a predetermined threshold, but allow other light to pass through), an optical highpass filter (e.g., configured to block, remove or reject light having a wavelength below or frequency above a predetermined threshold, but allow other light to pass through), or a combination thereof. The transmitter optical path may further include one or more lenses and/or waveguides at or proximate to the network-side port 134, within the housing 130. The lens(es) are generally configured to focus the optical signal onto a location in or on the optical fiber and/or to collimate or polarize the optical signal transmitted to the network. The waveguide(s) are generally configured to direct and/or combine the optical signal(s) from the transmitter optical path to the optical fiber connected at the network-side port 134.

The second optical amplifier 115 is configured to receive an optical signal from the network through the second network-side port 135. The optical signal from the network may be transmitted over a conventional optical fiber, and the characteristics of the optical signal from the network may be the same as or different from those of the optical signal from the host. For example, the optical signal from the network may be the same type of signal (e.g., single mode vs. multi-mode, single signal vs. plurality of multiplexed signals) as the optical signal from the host, but may have a wavelength or wavelength range different from that of the optical signal from the host. Similarly, the characteristics of the second optical amplifier 115 may be the same as or different from those of the first optical amplifier 110. For example, the second optical amplifier 115 may comprise the same type of semiconductor optical amplifier (SOA) as the first optical amplifier 110 and have a structure similar or identical to that of the first optical amplifier 110 (e.g., the number of layers and material[s] in each layer, the presence or absence of anti-reflective coatings and/or angled wave guide and/or window regions and the number of such features present, etc.) and identical functionality (e.g., operation[s] performed), but the specific dopant concentrations, wave guide or window region angles, layer thicknesses, wavelength conversions, etc., may differ from the first optical amplifier 110. The receiver optical path may further include one or more lenses at or proximate to the network-side port 135, within the housing 130 and configured to focus the optical signal received from the network onto the second optical amplifier 115 and/or to collimate or polarize the optical signal received from the network.

Like the first optical amplifier 110, the second optical amplifier 115 may introduce out-of-band noise into the amplified optical signal 117. Consequently, the second optical filter 125 is configured to filter the amplified optical signal 117 from the second optical amplifier 115 and provide a filtered amplified optical signal 127 to the host through the second host-side port 137. The second optical filter 125 may function identically to the first optical filter 120, and may have a similar or identical structure, depending on the type and/or wavelength(s) of light being filtered. Thus, the second optical filter 125 may comprise an optical bandpass filter, an optical longpass or lowpass filter, an optical highpass filter, or a combination thereof, similar or identical to the first optical filter 120, but configured to block, remove or reject different wavelengths of light than the first optical filter 120. The receiver optical path may further include one or more lenses and/or one or more waveguides at or proximate to the network-side port 134, within the housing 130. The lens(es) are generally configured to focus the optical signal onto a location in or on the optical fiber and/or to collimate or polarize the optical signal transmitted to the network. The waveguide(s) are generally configured to direct and/or combine the optical signal(s) from the receiver optical path to the optical fiber connected at the host-side port 137.

The housing 130 generally comprises one or more structures that house and protect the first optical amplifier 110, the first optical filter 120, the second optical amplifier 115 and the second optical filter 125, and that provide one or more surfaces on which the first optical amplifier 110, the first optical filter 120, the second optical amplifier 115 and the second optical filter 125 can be mounted or affixed. The ports 132, 134, 135 and 137 may be integrated in the wall of the housing 130, contained within the housing 130, or mounted on or secured or affixed to an internal or external structure or surface of the housing 130. Like the first and second host-side ports 132 and 137, the first and second network-side ports 134 and 135 may be combined into a single port/connector for a single single-mode or multi-mode fiber, in which case the combined network port and/or O2O transceiver further comprises a beam splitter configured to reflect either the incoming or outgoing optical signals and allow the other of the incoming or outgoing optical signals to pass through. The housing 130 may include a single optical cavity for both the transmitter and receiver optical paths, or may have separate optical cavities (e.g., separated by an opaque or light-blocking partition) for the transmitter and receiver optical paths. In addition, each of the transmitter and receiver paths in the O2O transceiver 100 can receive one or more single-mode or multi-mode optical signals and independently transmit the same or a different number of single-mode or multi-mode optical signals.

Figure 3:
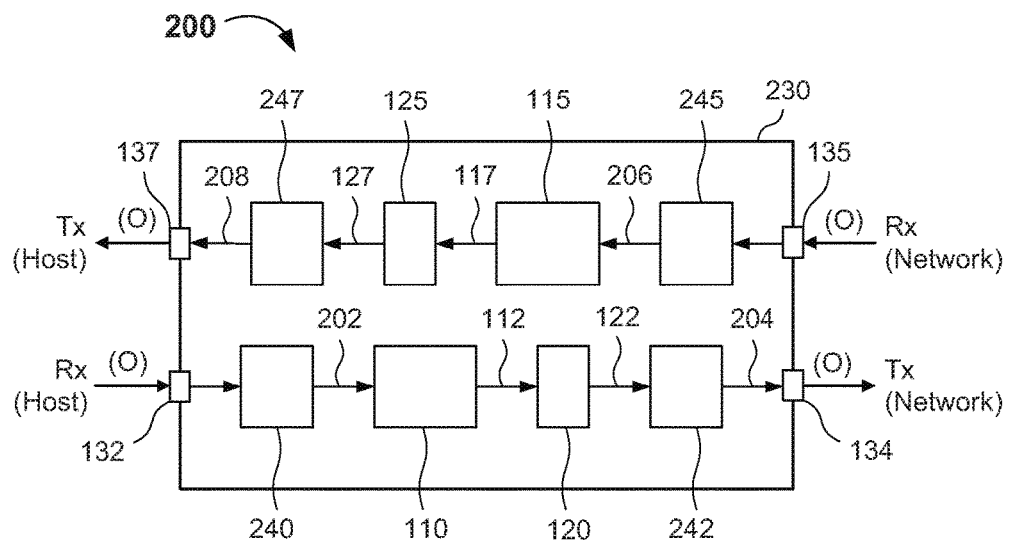
FIG. 3 is a block diagram showing another exemplary O2O transceiver in accordance with one or more embodiments of the present invention.

FIG. 3 shows another exemplary O2O transceiver 200, including the first optical amplifier 110, first optical filter 120, second optical amplifier 115, second optical filter 125, first and second host-side ports 132 and 137, and first and second network-side ports 134 and 135, as shown in FIG. 2, and a housing 230 similar or identical to that shown in FIG. 2. Thus, in the present disclosure, use of the same or similar identification number (i.e., having at least the same last two digits) to identify a particular component or signal incorporates by reference any or all descriptions of that component or signal elsewhere in this disclosure. The O2O transceiver 200 may also include one or more lenses and/or one or more waveguides in either or both of the transmitter and receiver paths, similar to the O2O transceiver 100 in FIG. 2.

The exemplary O2O transceiver 200 of FIG. 3 further includes first and second transmitter-side isolators 240 and 242, and first and second receiver-side isolators 245 and 247. The first host-side port 132, first transmitter-side isolator 240, first optical amplifier 110, first optical filter 120, second transmitter-side isolator 242 and first network-side port 134 may form or define a transmitter optical path, and the second network-side port 135, first receiver-side isolator 245, second optical amplifier 115, second optical filter 125, second receiver-side isolator 247 and second host-side port 137 may form or define a receiver optical path.

To protect the host laser and/or to minimize potential interference from light emitted from the first optical amplifier 110 towards the host-side port 132, the first transmitter-side isolator 240 is placed between the first optical amplifier 110 and the host-side port 132. The second transmitter-side isolator 242 similarly protects the first optical amplifier 110 from light reflected by the first network-side port 134 or a lens proximate thereto, although this may not be a significant issue for the first optical amplifier 110, so the second transmitter-side isolator 242 may be different from the first transmitter-side isolator 240, or may be absent.

The first and second transmitter-side isolators 240 and 242 isolate (e.g., block light travelling in the opposite direction of the optical path) optical signals 202 and 204, respectively. The first and second transmitter-side isolators 240 and 242 may comprise, e.g., optical isolators, polarization dependent isolators, or Faraday isolators. In embodiments in which the optical signal from the host is polarized, the first and second transmitter-side isolators 240 and 242 may isolate the respective the optical signals 202 and 204 by rotating the incoming optical signal by a predetermined angle or amount (e.g., 45°, 90°, etc.). In one case, the second transmitter-side isolator 242 may rotate the optical signal 122 by the same amount or angle as the first transmitter-side isolator 242, but in the opposite direction from the first transmitter-side isolator 242, thereby preserving the polarization type of the optical signal from the host (e.g., p-polarization). However, in other cases, the second transmitter-side isolator 242 may rotate the optical signal 122 in the same direction as the first transmitter-side isolator 242. When the first and second transmitter-side isolators 240 and 242 each rotate the incoming signals by 45°, the polarization type of the optical signal from the host changes (e.g., from p-polarization to s-polarization). However, when the first and second transmitter-side isolators 240 and 242 each rotate the incoming signals by 90°, the polarization type of the optical signal from the host is preserved. Also, various components of the isolators (e.g., a Faraday rotator, a quarter wave plate, birefringent wedge[s], etc.) may be combined in various ways to accomplish the isolation function (e.g., isolate optical signals 202 and 204, and preserve or change the polarization type of the optical signal from the host for transmission to the network).

An Exemplary Optical-to-Optical Transceiver with Clock and Data Recovery

Figure 1:
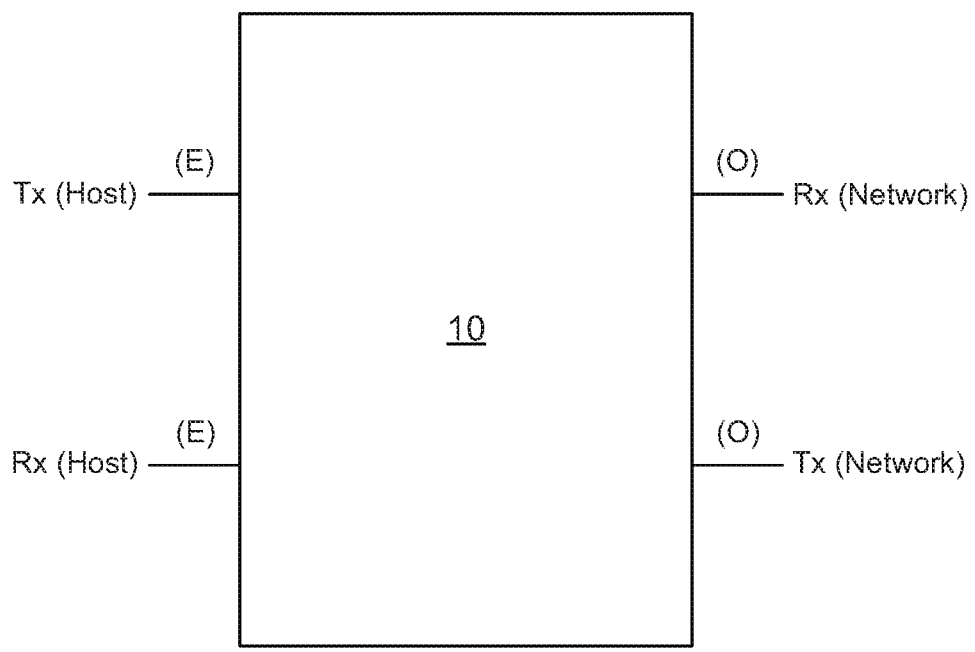
FIG. 1 is a diagram showing a conventional optoelectronic transceiver.
Figure 4:
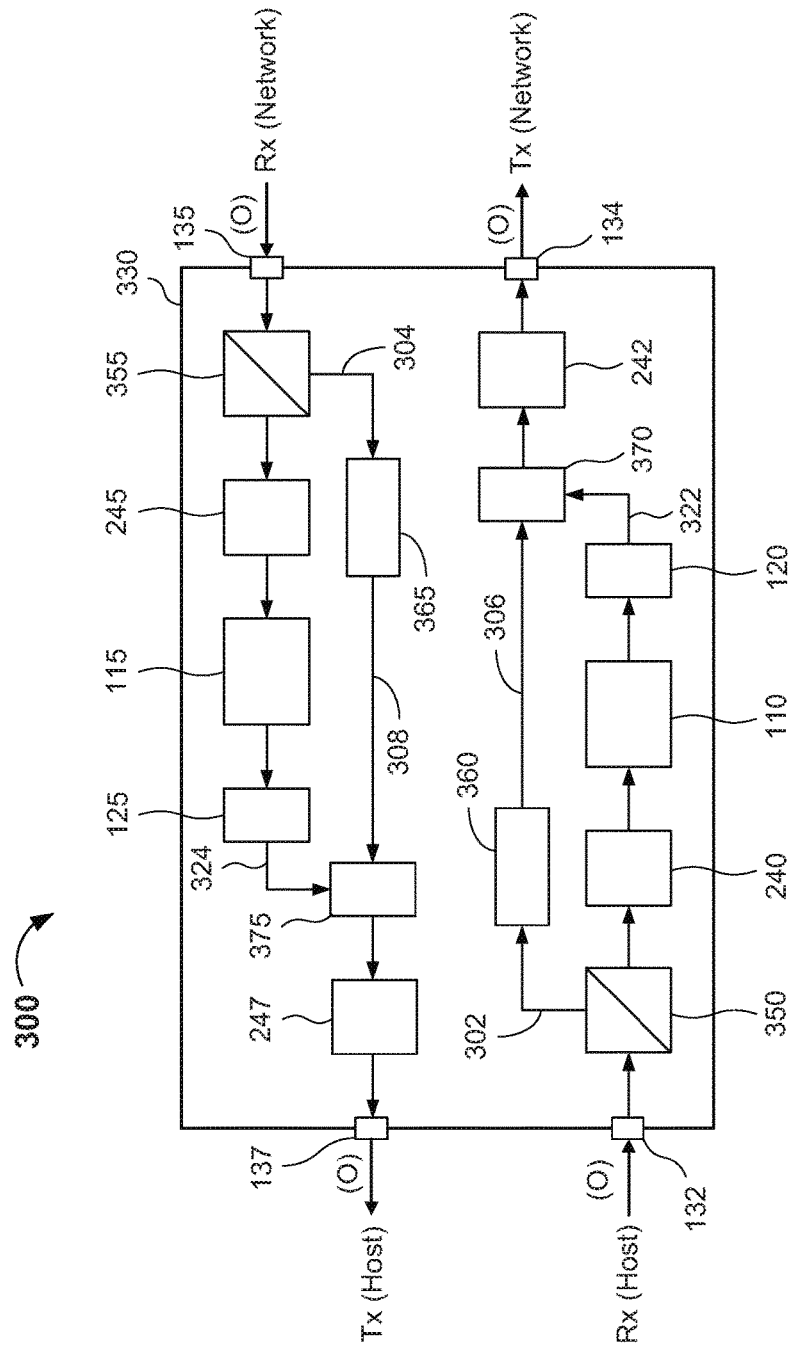
FIG. 4 is a block diagram showing a further exemplary O2O transceiver in accordance with one or more embodiments of the present invention.

In another aspect, the present invention concerns an optical device that includes the components of the exemplary O2O transceiver 200 in FIG. 3, plus clock and data recovery (CDR) capability. FIG. 4 shows an exemplary O2O transceiver 300, comprising the first optical amplifier 110, first optical filter 120, second optical amplifier 115, second optical filter 125, first and second host-side ports 132 and 137, and first and second network-side ports 134 and 135, as shown in FIGS. 1-2, and a housing 330 similar or identical to those shown in FIGS. 1-2. The exemplary O2O transceiver 300 also includes first and second transmitter-side isolators 240 and 242 and first and second receiver-side isolators 245 and 247, as shown in FIG. 2. The O2O transceiver 300 may also include one or more lenses and/or one or more waveguides in either or both of the transmitter and receiver paths, similar to the O2O transceiver 100 in FIG. 2. However, the exemplary O2O transceiver 300 further comprises a first beam splitter 350, a first optical clock recovery unit 360 with clock recovery functionality, a first optical gate 370, a second beam splitter 355, a second optical clock recovery unit 365 with clock recovery functionality, and a second optical gate 375.

The first host-side port 132, first beam splitter 350, first transmitter-side isolator 240, first optical amplifier 110, first optical filter 120, first optical gate 370, second transmitter-side isolator 242 and first network-side port 134 may form or define a transmitter optical path in the O2O transceiver 300. The first beam splitter 350, first optical clock recovery unit 360 and first optical gate 370 may form or define a transmitter CDR path.

The second network-side port 135, second beam splitter 355, first receiver-side isolator 245, second optical amplifier 115, second optical filter 125, second optical gate 375, second receiver-side isolator 247 and second host-side port 137 may form or define a receiver optical path in the O2O transceiver 300. The second beam splitter 355, second optical clock recovery unit 365 and second optical gate 375 may form or define a receiver CDR path.

First and second beam splitters 350 and 355 are generally non-selective beam splitters. That is, they generally direct a predetermined proportion (e.g., from 5% to 95%, or any value or range of values therein) of the received optical signal (e.g., Rx (Host) or Rx (Network)) towards the corresponding optical clock recovery unit 360 or 365. In some embodiments, the O2O transceiver 300 may further comprise one or more mirrors or other reflective surfaces configured to reflect the split optical signal 302 or 304 towards the corresponding optical clock recovery unit 360 or 365. In alternative arrangements, the first beam splitter 350 may be downstream from the first receiver-side isolator 240, the first optical amplifier 110, or the first optical filter 120. For example, the received optical signal Rx (Host) may pass through the first transmitter-side isolator 240 and the first optical amplifier 110, or the first transmitter-side isolator 240, first optical amplifier 110 and first optical filter 120 before being split or separated by the first beam splitter 350. Similarly, and the second beam splitter 355 may be downstream from the first receiver-side isolator 245, the second optical amplifier 115 or the second optical filter 125 (e.g., the received optical signal Rx (Network) may pass through the first receiver-side isolator 245 and optical amplifier 115, or the isolator 245, optical amplifier 115 and optical filter 125 before being split or separated by the second beam splitter 355).

The first and second optical clock recovery units 360 and 365 are configured to recover and/or generate an optical clock signal 306 or 308 from the split optical signals 302 and 304, respectively. In one example, each of the first and second the optical clock recovery units 360 and 365 may comprise a mode-locked laser (MLL). Such MLLs are known in the art (see, e.g., Koch et al., *Optical Fiber Communication Conference/National Fiber Optic Engineers Conference*, OSA Technical Digest (CD) (Optical Society of America, 2008), paper OMNI, San Diego, Calif., 24-28 Feb. 2008, the relevant portions of which are incorporated herein by reference). The optical clock signals 306 and 308 have the same or substantially the same modulation frequency as the corresponding received optical signal, but a higher extinction ratio and less jitter than the corresponding received optical signal. The optical clock signals 306 and 308 may have the same wavelength as or a different wavelength from the corresponding received optical signal. However, the recovered optical clock signal(s) 306 and 308 may independently have (i) a wavelength different from that of the optical signal from which the optical clock signal is recovered and/or (ii) one or more fiber transmission properties (e.g., chirp, mode, etc.) different from those of the first optical signal or the first amplified optical signal. Such differences may allow for a longer transmission distance of the recovered optical clock signal.

The optical gates 370 and 375 are configured to select or discard the optical clock signal 306 or 308 from the corresponding optical clock recovery unit 360 or 365 based on the value of the optical data signal 322 or 324 from the respective filter 120 or 125. In one example, the optical gates 370 and 375 are optical switches that pass the respective optical clock signal 306 or 308 through to the respective optical isolator 242 or 247 when the optical data signal 322 or 324 has a first logic state (e.g., a binary "1" state), and that block the respective optical clock signal 306 or 308 from passing through the respective optical gate 370 or 375 to the respective optical isolator 242 or 247 when the optical data signal 322 or 324 has a different logic state (e.g., a binary "0" state). In some embodiments, the first and second optical amplifiers 110 and 115 may be omitted, as the optical signals received from the host and/or network can control the optical gates 370 and 375 without amplification. However, amplifying the optical signals received from the host and/or network can slightly widen the optical signal, so that it does not clip or cross the edge or transition of the recovered optical clock signal 306 or 308 at the optical gate 370 or 375.

The optical gates 370 and 375 may comprise a material or device having a non-linear refractive index, such as a non-linear crystal, a non-linear fiber, a semiconductor optical amplifier, a resonator, an interferometer, an optical waveguide, a loop mirror, an optical filter, an optical thyristor, a combination thereof, etc., having optical properties that enable the material to function as an optical switch. Thus, the optical data signals 322 and 324 and the respective optical clock signals 306 and 308 may each have a wavelength, modulation frequency, optical power and/or other characteristics sufficient to (i) enable the optical clock signal 306 or 308 to pass (or be transmitted) through the respective optical gate 370 or 375 when the optical data signals 322 and 324 have a first logic state, and (ii) enable optical gates 370 and 375 to block the respective optical data signals 322 and 324 from passing or being transmitted through the optical gate 370 or 375 when the optical data signals 322 and 324 have a second logic state different from the first logic state. Such characteristics of the optical data signals 322 and 324 and the optical clock signals 306 and 308 may depend on the optical properties of the respective optical gates 370 and 375.

When the optical gates 370 and 375 function in such a manner, they effectively retime and reshape the optical data signal to be transmitted to the network or the host. For example, when the received data has a logic "1" state, the recovered optical clock pulse is transmitted as the data signal (see, e.g., FIG. 6B and the discussion thereof herein). The transmitted data signal in such a case will generally have a higher extinction ratio and less jitter than the received optical data signal, and thus be "recovered," although its pulse width may be less than that of the received optical data signal. Furthermore, when the received data has a logic "0" state, the optical clock pulse is blocked (e.g., destructively interfered with, or modulated to have characteristics of an optical "0" logic state). Thus, the transmitted data signal in such a case will generally have characteristics of an optical "0" logic state, but with generally less noise than the received optical data signal.

Alternatively, the optical gates 370 and 375 may comprise an optical multiplexer that outputs the optical clock signal when the received optical data signal has the first logic state, and that outputs the received optical data signal when the received optical data signal has the second logic state. Such an optical multiplexer would therefore have the same functionality as an optical switch, but may have fewer or smaller issues with transmitted optical data having the "0" logic state. It is within the skills and abilities of one skilled in the art to implement such an optical multiplexer.

In further alternative arrangements, the first and second optical gates 370 and 375 may be downstream from the second transmitter-side isolator 242 and the second receiver-side isolator 247, respectively. In such a case, a third optical isolator (not shown) may be placed in the transmitter and/or receiver optical paths between the respective filter 120/125 and the respective optical gate 370/375. Additionally, regardless of the placement of the second isolators 242 and 247 relative to the first and second optical gates 370 and 375, the O2O transceiver 300 may comprise third and fourth filters (not shown) between a respective optical gate 370/375 and a respective transmission (Tx) port 134/137, either upstream or downstream from the respective second isolator 242/247.

In an even further alternative embodiment, each of the receiver and transmitter paths in the O2O transceiver 300 may further comprise a phase adjustment unit between the optical clock recovery unit 360/365 and the optical gate 370/375, configured to adjust a phase of the optical clock signal 306/308. In one example, the phase adjustment unit comprises (i) one or more optical switches and (ii) one or more optical delay lines configured to receive the optical clock signal 306/308 from the optical switch(es) and change the phase of the optical clock signal 306/308 by a predetermined amount. Such a phase adjustment unit operates entirely in the optical domain. Alternatively, the phase adjustment unit may comprise an optical-to-electrical-to-optical (OEO) path comprising an optical-to-electrical (O2E) converter, an electrical signal processor, and an electrical-to-optical (E2O) converter, in which the phase adjustment to the optical clock signal 306/308 is made by the electrical signal processor in the electrical domain. Such optical-to-electrical-to-optical (OEO) paths, O2E converters, electrical signal processors and E2O converters are shown in and described with respect to FIGS. 9-10 herein.

An Exemplary Network System Including a Plurality of Optical-to-Optical Transceivers The present invention further relates to a network system or device (e.g., an optical switch or router) comprising a plurality of the present optical or optoelectronic transceivers, at least one controller configured to control the operations of the transceivers, at least one memory configured to store instructions and data for and/or from the controller(s) and the transceivers, and a housing or shell configured to house the transceivers, the controller(s) and the at least one memory. In various embodiments, the optical or optoelectronic transceivers may comprise O2O transceivers or hybrid transceivers (e.g., having one O2O signal path and one optical-to-electrical [O2E], electrical-to-optical [E2O], or optical-to-electrical-to-optical [OEO] signal paths).

Figure 5:
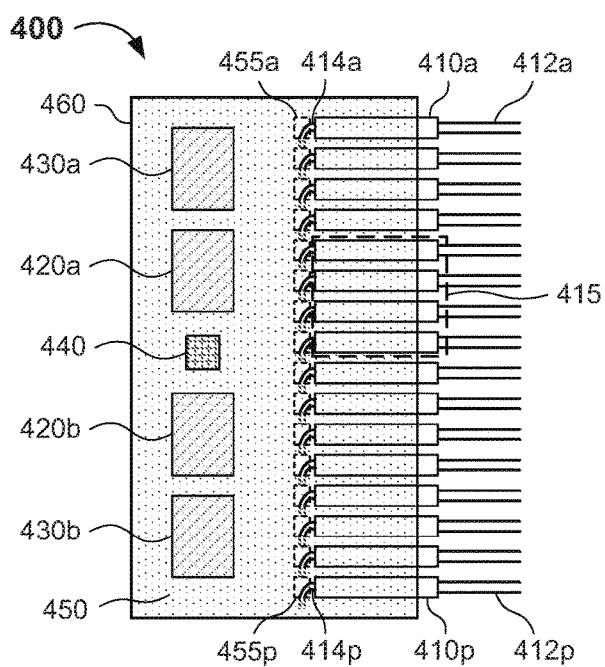
FIG. 5 is a block diagram showing an exemplary network system (e.g., an optical switch or router) including a plurality of O2O transceivers and a host board with one or more controllers (e.g., a switching IC providing optical I/O capability) in accordance with one or more embodiments of the present invention.

FIG. 5 shows an exemplary network system or device 400 including a plurality of O2O transceivers 410a-p and a host board 450 that provides an interface to switching ICs with optical I/O capability. Thus, the network system or device 400 may further comprise first and second controllers 420a-b, first and second memories 430a-b, a clock device 440, and a housing or shell 460 configured to enclose, support and/or protect the transceivers 410a-p (or optical modules comprising two or more of the transceivers 410a-p), the host board 450, and the controllers 420a-b, memories 430a-b and clock device 440 on the host board 450. Although the network system or device 400 as shown includes 16 transceivers, any plural integer number of transceivers may be present (e.g., 2 or more, 4 or more, 8 or more, etc.). in addition, a plurality (e.g., 2, 4, or more) of the transceivers 410a-p may be in the form of an optical module 415 (e.g., a unit comprising multiple transceivers).

Generally, each of the O2O transceivers 410a-p includes an optical fiber 412a-p connected to a network port for carrying optical signals to and from a network and an optical fiber 414a-p connected to a host port for carrying optical signals to and from a host. Each of the network ports and host ports may comprise separate signal reception and signal transmission ports. Thus, in alternative embodiments, each transceiver 410a-p may have two optical fibers connected to either or both of the network port(s) and/or the host port(s), one for transmitted signals and the other for received signals.

The O2O transceivers 410a-p effectively pass optical signals received from the host through to the network, and from the network through to the host. As a result, the housing or shell 460 may include one or more openings 455a-p through which the optical fibers 414a-p to/from the host pass. Alternatively, the O2O transceivers 410a-p may include one or more waveguides at either or both of the host ports, similar to the O2O transceiver 100 in FIG. 2. Although 16 openings 455a-p are shown in FIG. 5, two or more of the openings 455a-p may be combined to reduce the number of openings, thereby simplifying manufacturing and increasing cooling of the transceivers 410a-p and electrical devices in the housing or shell 460. On the other hand, when the openings 455a-p are combined (and thus, are larger), the housing or shell 460 may provide less mechanical support to the transceivers 410a-p, any printed circuit board on which the electrical devices (e.g., controllers 420a-b, memories 430a-b and clock device 440) are mounted, and any heat transfer device or structure therein. Alternatively, the openings 455a-p may be replaced by a conventional optical fiber-to-optical fiber connector.

Furthermore, two or more transceiver functions may be combined in one optical module 415. For example, the optical module 415 may include a plurality (e.g., four) of the O2O transceivers 410e-h, generally in its own housing (in which case each individual transceiver 410e-h may not include a separate housing, but each individual receiver and transmitter in the module 415 may be enclosed in its own housing or package). Thus, the optical module 415 may comprise a plurality of O2O receivers and a plurality of O2O transmitters, and in further embodiments, a network port connected to a first multi-channel optical fiber, a host port connected to a second multi-channel optical fiber, a first optical demultiplexer configured to separate the optical signals received from one of the first and second multi-channel optical fibers into individual channels (e.g., according to wavelength) for processing by the corresponding O2O receivers or transmitters, a first optical multiplexer configured to combine the processed optical signals from the corresponding O2O receivers or transmitters into a first multi-channel optical signal for transmission on the other of the first and second multi-channel optical fibers, a second optical demultiplexer configured to separate the optical signals received from the other of the first and second multi-channel optical fibers into individual channels (e.g., according to wavelength) for processing by the other of the corresponding O2O receivers or transmitters, and a second optical multiplexer configured to combine the processed optical signals from the other of the O2O receivers or transmitters into a second multi-channel optical signal for transmission on the other of the first and second multi-channel optical fibers.

The first and second controllers 420a-b may be configured to monitor and/or control operations of the O2O transceivers 410a-p and store and retrieve information and commands or instructions from the first and second memories 430a-b. For example, one or both of the first and second controllers 420a-b may be a switching IC on the host board 460 that has optical input/output (I/O) functionality and/or capability, to which the O2O transceivers 410a-p are connected. When one of the first and second controllers 420a-b is such a switching IC (e.g., an optical I/O controller), the other of the first and second controllers 420a-b may be an operational controller (e.g., configured to control other operations of the network system/device, such as memory read and write operations, parametric sampling, start/stop/sleep functions, interrupt and/or acknowledge functions, etc.). Alternatively, the first controller 420a may control the transmitter operations of the O2O transceivers 410a-p (e.g., the devices along the transmitter optical path and any electrical circuitry configured to control such devices), and the second controller 420a may control the receiver operations of the O2O transceivers 410a-p (e.g., the devices along the receiver optical path and any electrical circuitry configured to control such devices). In such an alternative embodiment, the transmitter functions may proceed at a different rate or frequency than the receiver functions. In a further alternative, the first controller 420a may control a first subset of the O2O transceivers 410a-p (e.g., transceivers 410a-j), including the optical I/O functions thereof, and the second controller 420a may control a second subset of the O2O transceivers 410a-p (e.g., transceivers 410h-p), including the optical I/O functions thereof.

Although two controllers 420a and 420b are shown, a single controller or three or more controllers may be used to control the various operations of the transceivers and electrical devices in the network system or device 400. The first and second controllers 420a-b may further control (e.g., turn on and/or off, divide and/or multiply, etc.) the clock signal(s) output by the clock device 440. Thus, the first and second controllers 420a-b are commonly referred to as the Integrated Circuits (ICs) on the host board and may be or comprise one or more microcontrollers, microprocessors, signal processors, field-programmable gate arrays (FPGAs), complex programmable logic devices (CPLDs), application specific integrated circuits (ASICs), or other programmable integrated circuit or device capable of driving operations on the network system.

The first and second memories 430a-b store instructions and/or commands for the first and second controllers 420a-b and information and/or data from the O2O transceivers 410a-p, among other things. Thus, one of the first and second memories 430a-b may store instructions and/or commands for the first and second controllers 420a-b, and be or comprise a nonvolatile memory such as a read-only memory (ROM), an electrically programmable ROM (EPROM), an electrically erasable and programmable ROM (EEPROM), a flash memory, a magnetic random access memory (MRAM), etc., and the other of the first and second memories 430*a-b* may store data from the O2O transceivers 410*a-p*, and be or comprise a volatile memory such as static random access memory (SRAM), dynamic random access memory (DRAM), etc. The random access memory may comprise a plurality of registers configured to store certain or predetermined information. The volatile and nonvolatile memories may be alone or in a combination with the other of the volatile and nonvolatile memories. One or more clock signals from the clock device 440 (which may be further multiplied, divided, retimed and/or gated by a controller 420*a* or 420*b* or another discrete device [not shown]) may be used to control the timing of read and/or write operations in each of the memories 430*a-b*. Although two memories 430*a* and 430*b* are shown, a single memory device or three or more memories may be used to store instructions, commands, information and/or data for and/or from the transceivers and electrical devices in the network system or device 400. Furthermore, one or more of the memories 430*a* and 430*b* may be integrated into one or more of the controllers 420*a-b*.

The clock device 440 provides one or more timing (e.g., periodic or clock) signals to the O2O transceivers 410*a-p*, first and second controllers 420*a-b* and first and second memories 430*a-b*. The timing signals are configured to control the timing of various operations in the network system or device 400, such as read and write operations in the memories 430*a-b*, instruction fetching and/or execution in the controllers 420*a-b*, etc. The clock device 440 may further include one or more multipliers and/or dividers configured to change the frequency of the timing signal(s) and/or one or more buffers or drivers configured to amplify and/or shape the timing signal(s). Alternatively, such multipliers, dividers, buffers and/or drivers may be on a discrete device, such as a controller 420*a* or 420*b*.

Although the network system 400 is shown including an O2O transceiver, the O2O transceiver in FIG. 5 can be combined and/or replaced with a hybrid O2O-optoelectronic transceiver or a O2O transceiver with a pass-through connection, as described herein. In further embodiments, the present network system/device can also be an optical network unit (ONU), optical network terminal (ONT) or optical line terminal (OLT).

An Exemplary Method of Using an Optical-to-Optical Transceiver

The present invention further relates to a method of using an optical or optoelectronic transceiver to process optical signals completely in the optical domain, without any conversion of optical signals to electrical signals or vice versa. Generally, the method includes receiving the optical signals from one of a host and a network in an optical-to-optical (O2O) signal path in an optical or optoelectronic transceiver, amplifying the optical signals (e.g., using an optical amplifier in the O2O signal path), and transmitting the amplified optical signal to the other of the host and the network. The method may further comprise filtering the amplified optical signals using an optical filter, in which case the filtered and amplified optical signals are transmitted. In many embodiments, a first optical signal is received from a host and the amplified (an optionally filtered) first optical signal is transmitted to a network, and a second optical signal is received from the network and the amplified (an optionally filtered) second optical signal is transmitted to the host.

Figure 6A:
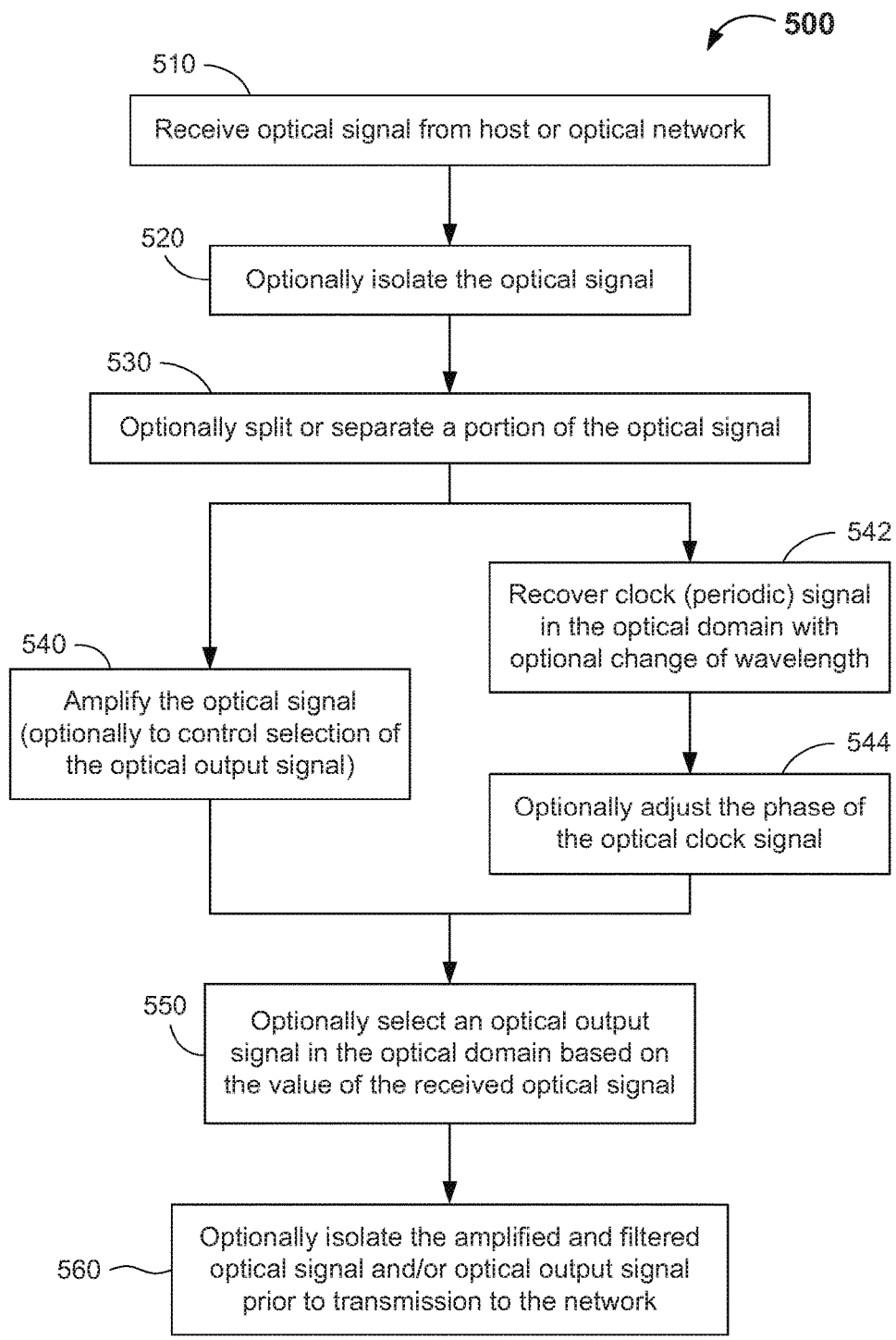
FIG. 6A is a flow chart of an exemplary method of using an O2O transceiver and FIG. 6B is a diagram showing exemplary waveforms of signals in an exemplary O2O transceiver in accordance with embodiments of the present invention.
Figure 6B:
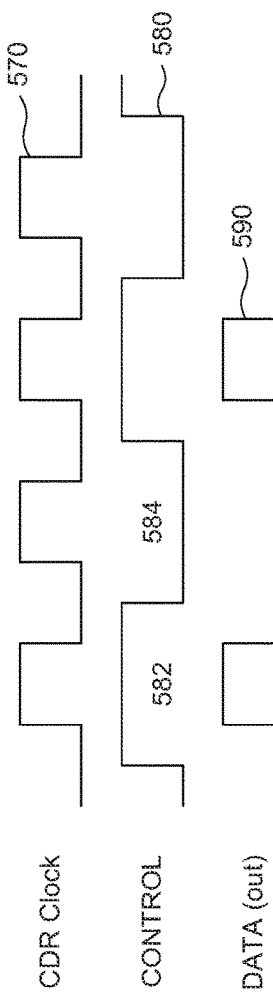

FIG. 6A is a flow chart 500 showing an exemplary method of transmitting an optical signal from a host to an optical network. At 510, the optical signal is received in an optical or optoelectronic transceiver having an O2O signal path (e.g., as described herein) from a host or an optical network. The optical signal may have a wavelength, a modulation amplitude and a modulation frequency characteristic of optical signals from a conventional host or optical network, and may have an optical power within a range suitable for optical amplification (e.g., from −30 dB to +5 dB or any value or range of values therein).

At 520, the optical signal received from the host or optical network may be optically isolated (e.g., by passing it through a conventional optical isolator). In so doing, when the optical signal is polarized, the angle of polarization may be changed (e.g., by 45°). A portion of the optical signal is optionally split or separated from the received optical signal at 530. This may be done by passing the optical signal from the host through a non-selective beam splitter, as described herein. The sequence of optically isolating the optical signal and splitting or separating the portion from the optical signal may be reversed.

At 540, the optical signal from the host (or the remainder of the optical signal after splitting the portion from the optical signal, either of which may be optically isolated) may be amplified using an optical amplifier, as described herein. In some embodiments, the optical amplifier may comprise a conventional semiconductor optical amplifier. Optionally, the amplified optical signal may also be filtered at 540, preferably after being amplified. In some embodiments, the amplified optical signal controls selection of an optical output signal (e.g., using an optical gate, as described herein).

At 542, an optical clock signal 570 (FIG. 6B) is optionally recovered from the split or separated portion of the received optical signal. The optical clock signal 570 is a periodic signal having a characteristic frequency v. In one embodiment, the optical clock signal 570 is recovered from the portion of the optical signal using an optical clock recovery unit (e.g., a mode-locked laser with clock recovery capability), as described herein. In some embodiments, the recovered optical clock signal 570 may have a different wavelength from the received optical signal. The phase of the recovered optical clock signal 570 may be changed or adjusted at 544 (FIG. 6A) to reduce, minimize or eliminate possible timing issues (e.g., at an optical gate) between the recovered optical clock signal 570 (FIG. 6B) and the optical signal 580 (which may be amplified, or amplified and filtered).

At 550 (FIG. 6A), an optical output signal may be selected and/or transmitted based on the value of the data in the received optical signal (or in the amplified or filtered, amplified optical signals, the data values of all of which should be the same). For example, selecting and/or transmitting the optical output signal may comprise (i) passing the recovered optical clock signal through to the other of the host and the optical network or (ii) blocking transmission of the recovered optical clock signal to the other of the host and the optical network, using an optical gate. Alternatively, using the optical gate, the optical output signal may be the recovered optical clock signal or the amplified optical signal (which may also be filtered), as described herein.

In either case, at 550, the received optical signal can function as a control signal 580 (FIG. 6B) for the optical gate. For example, when a data bit in the optical signal (e.g., CONTROL) 580 has a first logic state 582 (e.g., a logical "1" in binary logic), the optical gate may output the recovered clock signal 570 as the optical output signal (e.g., DATA [out] 590). Furthermore, when a data bit in the optical signal (CONTROL) 580 has a second logic state 584 (e.g., a logical "0" in binary logic), the optical gate may discard or block the optical output signal 590 (e.g., suppress or destructively interfere with the recovered clock signal 570 or the amplified optical signal passing through a non-control terminal of the optical gate). In one embodiment, the optical gate comprises an optical switch controlled by the received optical signal (e.g., the amplified and optionally filtered optical signal) 580.

Finally, at 560 (FIG. 6A), the amplified and filtered optical signal and/or the optical output signal may be optically isolated prior to transmission to the optical network, depending on the optical signal to be provided to the optical network. The optical isolation at 560 protects the optical amplifier from any reflections of the optical output signal (e.g., from the end of the optical fiber or a focusing lens at an output port of the transceiver) that could potentially damage the optical amplifier. Thus, all operations in the exemplary method of FIG. 6A are performed in the optical domain.

An Exemplary Method of Making an Optical-to-Optical Transceiver

A further aspect of the invention relates to a method of manufacturing an optical or optoelectronic transceiver having an optical-to-optical (O2O) signal path, comprising mounting, affixing or securing (hereinafter, "securing") first and second ports to a housing of the transceiver, and securing a first optical amplifier to a first internal surface(s) of the transceiver along the O2O signal path. A path from the first port to the second port defines the O2O signal path. In further embodiments, the method further comprises securing a first optical filter to a second internal surface of the transceiver along the optical-to-optical signal path and/or securing a second optical amplifier to a third internal surface of the transceiver along a second O2O signal path. In the latter embodiment, the method further comprise securing a second optical filter to a fourth internal surface of the transceiver along the second optical-to-optical signal.

The first optical amplifier and first optical filter are respectively configured to amplify and filter a first optical signal from one of a host and a network. The second optical amplifier and second optical filter are respectively configured to amplify and filter a second optical signal from the other of the host and the network. Thus, one of the first optical amplifier/optical filter and the second optical amplifier/optical filter combinations may define a transmitter optical path in the O2O transceiver, and the other may define a receiver optical path in the O2O transceiver.

Securing the optical amplifier(s) and the optical filter(s) may comprise placing the optical amplifier(s) and the optical filter(s) in predetermined locations in an optical cavity of the transceiver, determining an optical strength of an optical output signal from each optical amplifier (or, when present, each optical filter), adjusting a position of each optical amplifier and/or each optical filter (when present) until the optical strength of the optical output signals exceeds a predetermined threshold, and affixing or securing each optical amplifier and optical filter (when present) in the positions corresponding to the optical strength exceeding the threshold. The optical cavity may comprise a first optical cavity for components along the transmitter optical path, and a second optical cavity for components along the receiver optical path. Components may be placed in the predetermined locations using a curable adhesive, then the adhesive may be cured (e.g., using ultraviolet [UV] light) after the components are in the positions that maximize the optical strength of the optical output signals.

In some embodiments, the method may further comprise securing first and optionally second isolators to the internal surface(s) of the transceiver along the respective first and second O2O signal paths. The first and second isolators are respectively configured to optically isolate the first and second optical signals prior to amplification by the respective first and second optical amplifiers. The method may further comprise securing third and optional fourth isolators to the internal surface(s) of the transceiver along the respective first and second O2O signal paths. The third and fourth isolators are respectively configured to optically isolate the amplified (and optionally filtered) first and second optical signals. The first, second, third and fourth isolators may be secured to surfaces of the optical cavity corresponding to the optical signal being optically isolated, in the same or a similar manner as the first and second optical amplifiers and the first and second optical filters.

In additional or alternative embodiments, the method may further comprise securing first and second beam splitters, first and second optical clock recovery units, and/or first and second optical gates to internal surface(s) of the transceiver along the respective first and second O2O signal paths. The first and second beam splitters are respectively configured to split or separate a portion of the first and second optical signals prior to amplification by the corresponding first and second optical amplifiers. The first and second optical clock recovery units are respectively configured to recover first and second optical clock signals from the corresponding portion of the first or second optical signal. The first and second optical gates are configured to select first and second optical output signals from the corresponding optical clock signal or filtered, amplified optical signal based on the value of the corresponding optical signal. In such embodiments, the first optical gate may be configured to output or discard the first optical clock signal based on the value of the first optical signal, and the second optical gate may be configured to output or discard the second optical clock signal (when present) based on the value of the second optical signal. The first and second beam splitters, first and second optical clock recovery units, and first and second optical gates may be secured to a surface of the optical cavity corresponding to the optical signal being optically isolated, in the same or a similar manner as the first and second optical amplifiers and the first and second optical filters.

The method of manufacturing may further comprise enclosing the components of the transceiver in a housing, after the components are secured in their locations/positions. In one example, the components are secured to a surface of either a transmitter optical cavity or a receiver optical cavity, the transmitter and receiver optical cavities are integrated with or secured to a base of the housing, and enclosing the components in the housing comprises securing a shell or cover to the base of the housing, over the transmitter and receiver optical cavities. First through fourth ports (e.g., conventional connectors for optical fibers to and from the host and to and from the optical network) may be formed in or secured to the housing (e.g., in or to one or both of the base and the shell or cover).

Hybrid Transceivers with Optical-to-Optical Functionality

Figure 7:
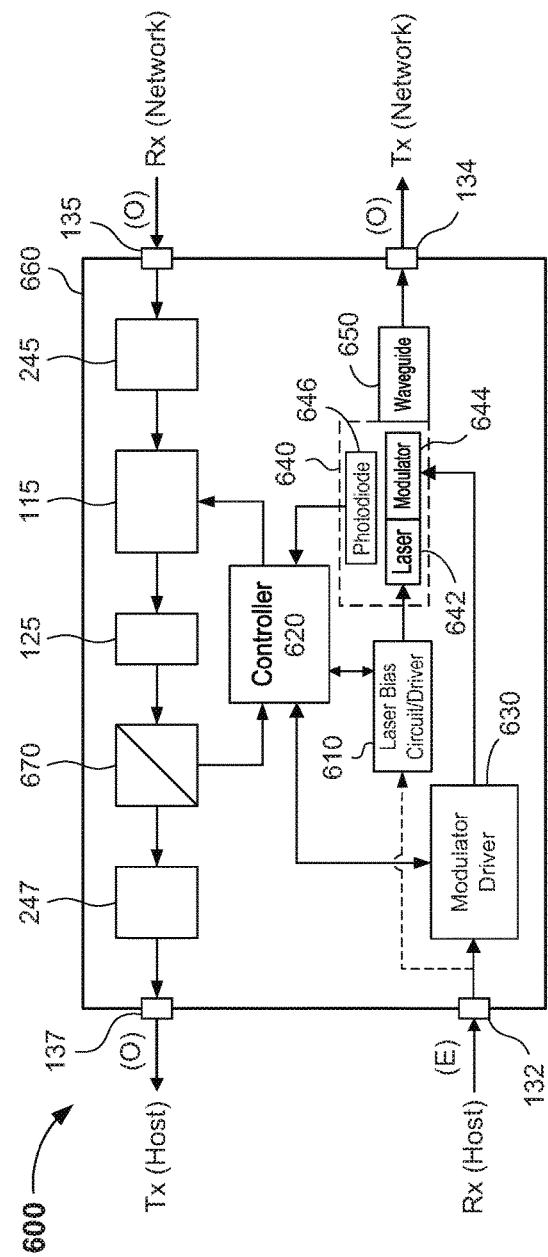
FIGS. 7-8 are block diagrams showing exemplary hybrid O2O and optoelectronic transceivers in accordance with embodiments of the present invention.

FIG. 7 shows an exemplary hybrid optical-to-optical (O2O) and electrical-optical transceiver 600, including an O2O receiver and an electrical-to-optical transmitter. Because it is challenging to make optical transmitters of sufficient quality and/or output power coupled into single-mode fiber(s) inside the host IC device (which typically runs at high temperatures), the hybrid optical transceiver 600 may be particularly advantageous.

The O2O receiver in FIG. 7 is essentially the O2O receiver in FIG. 3, including the network-side port 135, isolators 245 and 247, optical amplifier 115, optical filter 125, and host-side port 137, all of which operate substantially as described elsewhere herein. However, the O2O receiver in FIG. 7 may further comprise an optical tap 670 (e.g., a non-selective beam splitter, similar or identical to the beam splitter 355 in FIG. 4) and a controller 620. Such a controller (which may be or comprise a microprocessor, microcontroller, field programmable gate array, application specific integrated circuit or similar logic device) and optical tap may exist in the O2O transceivers 100, 200 and 300 in FIGS. 2-4. The hybrid transceiver 600 also includes a housing 660 that is similar or identical to the housing 330 in the O2O transceiver 300 of FIG. 3. Although the O2O receiver of FIG. 3 is shown in FIG. 7, any of the O2O receivers in FIGS. 2-4 can be used in the hybrid transceiver 600.

The electrical-to-optical (E2O) transmitter in FIG. 7 includes a modulator driver circuit 630, laser bias circuit 610, a transmitter optical subassembly (TOSA) 640, and one or more waveguides 650. The TOSA 640 includes one or more lasers (e.g., laser diodes) 642, one or more modulators 644, and one or more monitoring photodiodes 646 configured to monitor an output of the laser(s) 642 and/or modulator(s) 644. The lasers 642, modulators 644, and monitoring photodiodes 646 are generally in a 1:1:1 relationship. The controller 620 provides control signals and/or instructions to the modulator driver circuit 630 and bias circuit 610, and may receive information from the modulator driver circuit 630, the bias circuit 610, and/or the monitoring photodiode(s) 646.

In some embodiments, the hybrid optical transceiver 600 may further include a memory configured to store data (e.g., parametric information) and/or instructions, one or more counters, a clock circuit providing a periodic signal to the counter, memory and/or controller, and an optional battery. For example, the memory may store control information, parametric information, and operational information (e.g., warning and/or alarm threshold data) relating to the operation and performance of the hybrid optical transceiver 600. The locations of such information in the memory may be stored in an address and/or pointer memory or memory block.

Data from the host device may be received in the form of an electrical signal at the modulator driver circuit 630 for subsequent transmission to modulator(s) 644 and conversion to optical signals that are output to the network from the transmitter-side port 134 through waveguides 650. Laser diodes 642 continuously emit a light beam when the laser bias circuit 610 applies a sufficiently high current or voltage thereto. Modulators 644 either allow the light from laser diodes 642 to pass through or block such light in response to the data signals from the host. In one embodiment, the monitoring photodiode(s) 646 monitor the output of the laser(s) 642 and provide a feedback current to the controller 620 (optionally through an analog-to-digital converter [ADC], not shown), which is connected to and provides a driving current to the laser 642. The monitoring photodiode(s) 646, laser bias driver 610, and laser 642 form a closed loop automatic power control (APC) loop for maintaining a target optical output power from the TOSA 640.

Alternatively, the data from the host may be input to a laser driver 610, which may be configured to drive the laser(s) 642 at a target optical output power based on the value of the feedback current from the monitoring photodiode(s) 646. The E2O transmitter may also be operated by directly modulating the laser 642. The modulator may be absent in such an alternative embodiment.

Figure 8:
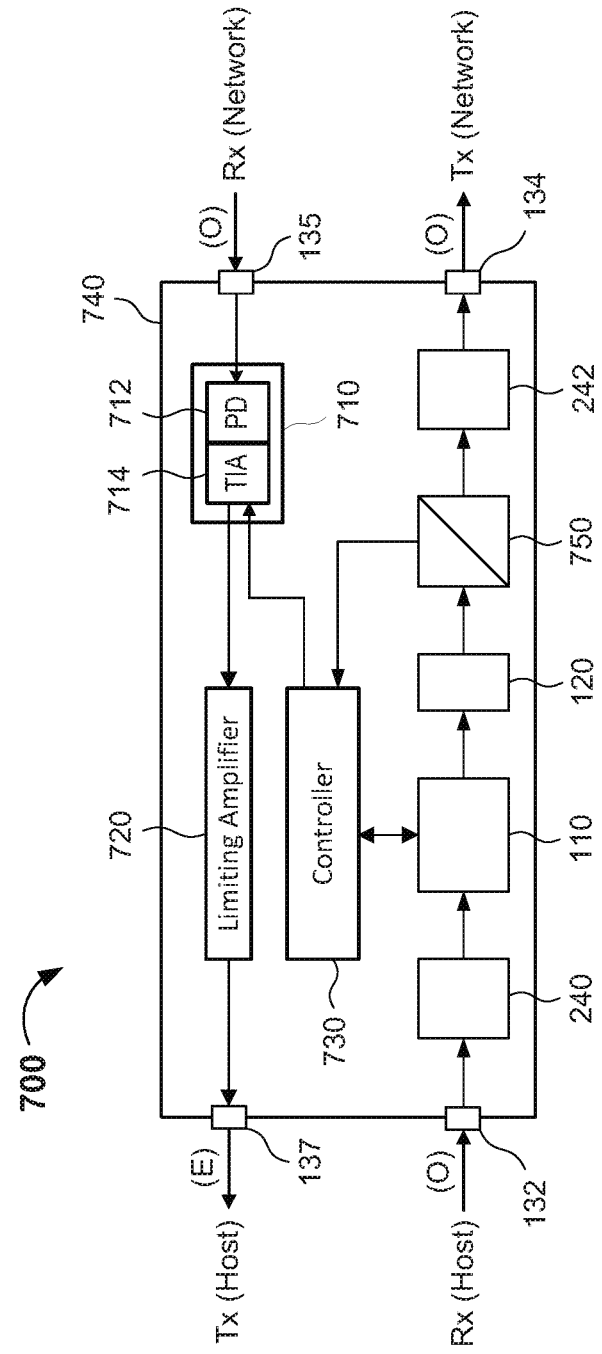

FIG. 8 shows another exemplary hybrid O2O and electrical-optical transceiver 700, including an O2O transmitter and an optical-to-electrical (O2E) receiver. Because it is challenging to provide optical receivers with polarization insensitivity and/or wavelength division multiplexing functionality, and at the same time with sufficient performance inside the host IC device, the hybrid optical transceiver 700 may be particularly advantageous.

The O2O transmitter in FIG. 8 is essentially the O2O transmitter in FIG. 3, including the host-side port 132, isolators 240 and 242, optical amplifier 110, optical filter 120, and network-side port 134, all of which operate substantially as described elsewhere herein. However, the O2O transmitter in FIG. 8 may further comprise an optical tap 750 (e.g., a non-selective beam splitter, similar or identical to the beam splitter 350 in FIG. 4 and/or the optical tap 670 in FIG. 7) and a controller 730. Such a controller and optical tap may exist in the O2O transceivers 100, 200 and 300 in FIGS. 2-4, and a bidirectional electrical connection may also exist between the controller 730 and the optical amplifier 110 (as may also exist between a controller and any optical amplifier in the transceivers 100-300 and 600 of FIGS. 2-4 and 7). The hybrid transceiver 700 also includes a housing 740 that is similar or identical to the housing 660 in the hybrid transceiver 600 of FIG. 7. Although the O2O transmitter of FIG. 3 is shown in FIG. 8, any of the O2O transmitters in FIGS. 2-4 can be used in the hybrid transceiver 700.

The O2E receiver in FIG. 8 includes a receiver optical subassembly (ROSA) 710 and a limiting amplifier 720. The ROSA 710 includes comprises a transimpedance amplifier (TIA) 714 and a photodiode (PD) 712. For example, the PD 712 may comprise a P-type/Intrinsic/N-type (PIN) photodiode or an Avalanche Photodiode (APD). The ROSA 710 is configured to receive an optical data signal Rx from the network (e.g., from an optical signal medium such as a fiber optic cable) and provide an electrical output signal to the limiting amplifier 720. The limiting amplifier 720 is configured to provide an amplified output signal Tx to the host through the host-side port 137, and limit the voltage of the electrical output signal. The controller 730 is configured to control and/or regulate various functions of the transceiver 700 (e.g., the TIA 714, the optical amplifier 110, etc.). Similar to the hybrid transceiver 600 of FIG. 7, the hybrid optical transceiver 700 may further include a memory configured to store data (e.g., parametric information) and/or instructions, one or more counters, a clock circuit providing a periodic signal to the counter, memory and/or controller, an optional battery, etc.

Figure 9:
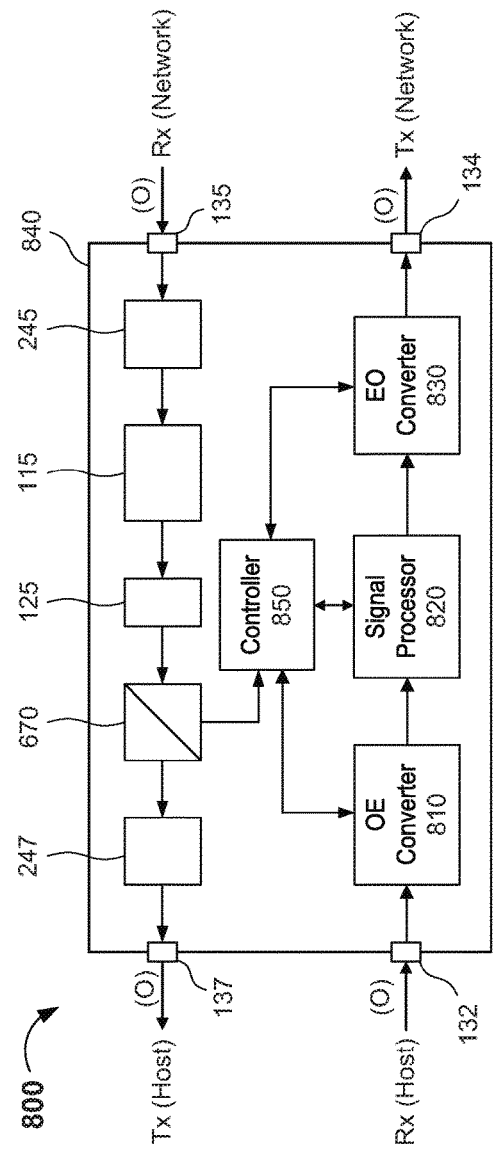

FIG. 9 shows another exemplary hybrid optical-to-optical (O2O) and optical-electrical-optical (OEO) transceiver 800, including an O2O receiver and an OEO transmitter. The O2O receiver in FIG. 9 is essentially the O2O receiver in FIGS. 3 and 7, including the network-side port 135, isolators 245 and 247, optical amplifier 115, optical filter 125, optical tap 670, and host-side port 137, all of which operate substantially as described elsewhere herein. The hybrid transceiver 800 also includes a housing 840 that is similar or identical to the housing 330 or 660 in the O2O transceivers 300 or 600 of FIGS. 3 and 7, respectively, and a controller 850 similar to the controller 620 of FIG. 7. Although the O2O receiver(s) of FIGS. 3 and 7 are shown in FIG. 9, any of the O2O receivers in FIGS. 2-4 can be used in the hybrid transceiver 800. Furthermore, as in the embodiments of FIGS. 7-8, the hybrid optical transceiver 800 may further include a memory configured to store data (e.g., parametric information) and/or instructions, one or more counters, a clock circuit providing a periodic signal to the counter, memory and/or controller, and an optional battery.

The OEO transmitter in FIG. 9 includes an optical-electrical (OE) converter 810, signal processing circuitry 820, and an EO converter 830. Each of the OE converter 810 and the EO converter 830 may have a plurality of channels, the number of which may be the same or different.

The OE converter 810 may include one or more optical receivers (e.g., photodiodes). The OE converter 810 may be configured to receive one or more inbound optical signals from the host (e.g., through host port 132) and convert the inbound optical signals to electrical signals for processing by the signal processor 820.

The signal processing circuitry 820 is communicatively coupled to the OE converter 810. The signal processing circuitry 820 may be configured to amplify and/or filter the electrical signals and generate or drive the same or a different number of electrical signals for the EO converter 830. In some embodiments, the signal processing circuitry 820 includes an amplifier configured to amplify the electrical signals from the OE converter 810, a clock and data recovery (CDR) circuit configured to recover a clock signal and data from the (amplified) electrical signals, and/or a laser driver configured to provide one or more (recovered) electrical data signals to the EO converter 830 at a level sufficient to drive a laser in the EO converter 830. In further embodiments, the signal processing circuitry 820 may further include an electrical signal demodulator configured to demodulate the electrical signals from the OE converter 810, a signal gearbox configured to convert a first plurality of electrical signals to a second plurality of electrical signals (where the number of signals in the second plurality is different from the first plurality), an optical signal modulator configured to modulate the electrical data signals for the EO converter 830, an analog-to-digital converter (ADC) configured to convert analog electrical signals (e.g., from the amplifier and/or a filter) to digital electrical signals, and/or a digital-to-analog converter (DAC) configured to convert digital electrical signals (e.g., from the amplifier, filter or CDR circuit) to analog electrical signals for the driver and/or EO converter 830.

The EO converter 830 is communicatively coupled to the signal processing circuitry 820 and may include one or more transmitters. The EO converter 830 may be configured to receive electrical signals from the signal processor 820 and convert the electrical signals to optical signals for transmission to the network through network port 134. Accordingly, the OEO transmitter of FIG. 9 is configured to convert inbound optical signals at the host-side port 132 to outbound optical signals at the network-side port 134.

FIG. 10 shows another exemplary hybrid optical-to-optical (O2O) and optical-electrical-optical (OEO) transceiver 900, including an O2O transmitter and an OEO receiver. The O2O transmitter in FIG. 10 is essentially the O2O transmitter in FIGS. 3 and 8, including the host-side port 132, isolators 240 and 242, optical amplifier 110, optical filter 120, optical tap 750, and network-side port 134, all of which operate substantially as described elsewhere herein. The hybrid transceiver 900 also includes a housing 940 that is similar or identical to the housing 330, 660 or 840 in the O2O transceivers 300, 600 or 800 of FIGS. 3, 7 and 9, respectively, and a controller 950 that is similar to the controller 730 or 850 of FIGS. 8-9, respectively. Although the O2O transmitter(s) of FIGS. 3 and 8 are shown in FIG. 10, any of the O2O transmitters in FIGS. 2-4 can be used in the hybrid transceiver 900. Furthermore, as in the embodiments of FIGS. 7-8, the hybrid optical transceiver 900 may further include a memory configured to store data (e.g., parametric information) and/or instructions, one or more counters, a clock circuit, as described herein.

The OEO receiver in FIG. 10 includes an optical-electrical (OE) converter 910, signal processing circuitry 920, and an EO converter 930. Each of the OE converter 910 and the EO converter 930 may have a plurality of channels, the number of which may be the same or different, and each of the OE converter 910, the signal processing circuitry 920 and the EO converter 930 may be the same as or similar to the OE converter 810, the signal processing circuitry 920 and the EO converter 830 of FIG. 9. Accordingly, the OEO transmitter of FIG. 10 is configured to convert the inbound optical signals at the network-side port 135 to outbound optical signals at the host-side port 137.

Figure 11A:
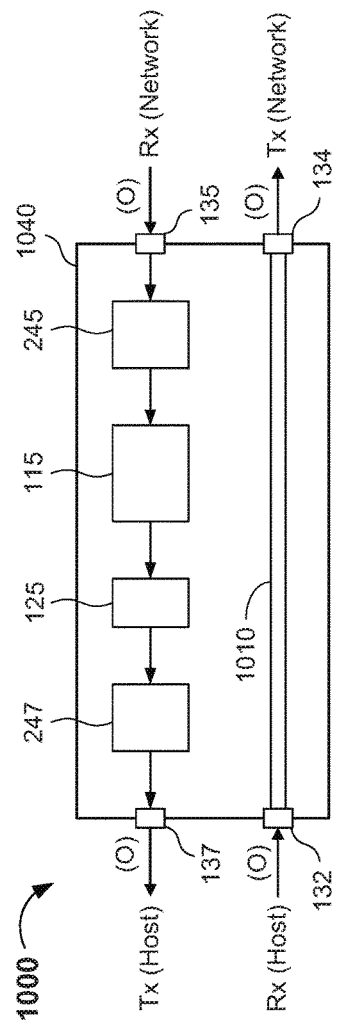

FIGS. 11A-B show further exemplary optical-to-optical (O2O) transceivers 1000 and 1050, respectively. FIG. 11A shows an O2O transceiver 1000 including an O2O receiver and a pass-through transmitter. FIG. 11B shows an O2O transceiver 1050 including an O2O transmitter and a pass-through receiver.

The O2O receiver in FIG. 11A is essentially the O2O receiver in FIGS. 3, 7 and 9, including the network-side port 135, isolators 245 and 247, optical amplifier 115, optical filter 125, and host-side port 137, all of which operate substantially as described elsewhere herein. The O2O transceiver 1000 also includes a housing 1040 that is similar or identical to the housing 330, 660 or 860 in the O2O transceivers 300, 600 or 800 of FIGS. 3, 7 and 9, respectively. The O2O transceiver 1000 may also include an optical tap and a controller, similar to the O2O transceivers 600 or 800 of FIGS. 7 and 9, respectively. Although the O2O receiver(s) of FIGS. 3, 7 and 9 are shown in FIG. 11A, any of the O2O receivers in FIGS. 2-4 can be used in the transceiver 1000.

The pass-through transmitter in FIG. 11A includes an optical pass-through connection 1010 coupled between the network-side port 135 and the host-side port 137. In one example, the pass-through connection 1010 comprises an optical fiber, and the host- and network-side ports 135 and 137 each independently comprise a push-on/pull-off connector or an LC (Little Connector or Lucent Connector) connector, for example. The network-side port 135 and/or the host-side port 137 and can receive a single fiber or multiple fibers, and the fibers (including the optical pass-through connection 1010) may be single-mode fibers or multi-mode fibers. Alternatively, the optical pass-through connection 1010 may comprise one or more lenses and/or one or more mirrors within an optical cavity in the housing 1040. The lens(es) and/or mirror(s) are configured to focus and/or direct the incoming optical signals at the network port 135 to an optical signal medium (e.g., one or more optical fibers) connected to an external side of the host port 137.

The O2O transmitter in FIG. 11B is essentially the O2O transmitter in FIGS. 3, 8 and 10, including the host-side port 132, isolators 240 and 242, optical amplifier 110, and network-side port 134, all of which operate substantially as described elsewhere herein. The O2O transceiver 1050 may also include an optical tap and a controller, similar to the O2O transceivers 700 or 900 of FIGS. 8 and 10, respectively. The O2O transceiver 1050 also includes a pass-through connection 1020 similar or identical to the pass-through connection 1010 of FIG. 11A, and a housing 1060 that is similar or identical to the housing 330, 760, 940 or 1040 in the O2O transceivers 300, 700, 900 or 1000 of FIGS. 3, 8, 10 and 1A, respectively. Although the O2O transmitter(s) of FIGS. 3, 8 and 10 are shown in FIG. 11B, any of the O2O transmitters in FIGS. 2-4 can be used in the transceiver 1050.

CONCLUSION/SUMMARY

Thus, the present invention provides an optical-to-optical transceiver, a network system or device (e.g., in a data center) including the same, and methods of making and using the same. The present optical-to-optical transceiver enables signal processing and signal transfer between a host and network system or devices in an optical network (e.g., a data center) completely in the optical domain. This increases signal transmission distances and link budgets for transceivers that perform such signal processing and transfers, thereby increasing the performance of such optical networks by allowing switches or routers to be separated by longer distances, and possibly reducing the number of switches or routers in a given network, which reduces the cost, power, and complexity of the optical network.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An optical or optoelectronic transceiver, comprising a receiver, a transmitter and a housing, wherein at least one of the receiver and the transmitter comprises an optical-to-optical signal path comprising:
   a) first and second ports;
   b) a first optical amplifier configured to receive a first optical signal from one of a host and a network through the first port and provide a first amplified optical signal for the other of the host and the network through the second port, and
   c) the other of the receiver and the transmitter comprises an optoelectronic signal path configured to receive an input signal from the other of the host or the network through a third port and provide an output signal to the one of the host and the network through a fourth port, the input signal is one of a first electrical signal and a second optical signal, and the output signal is (i) a third optical signal when the input signal is the first electrical signal and (ii) the third optical signal or a second electrical signal when the input signal is the second optical signal,
   wherein the housing is configured to contain the receiver and the transmitter.

2. The transceiver of claim 1, wherein the optical-to-optical signal path further comprises a first optical filter configured to filter a first amplified optical signal from the first optical amplifier and provide the first amplified optical signal for the other of the host and the network through the second port.

3. The transceiver of claim 2, wherein the optical-to-optical signal path further comprises a first optical isolator configured to optically isolate the first amplified optical signal and provide the optically isolated first amplified optical signal to the other of the host and the network.

4. The transceiver of claim 3, wherein the optical-to-optical signal path further comprises a second optical isolator configured to (i) optically isolate the first optical signal from the one of the host and the network and (ii) provide the optically isolated first optical signal to the first optical amplifier.

5. The transceiver of claim 1, further comprising a first optical clock recovery unit configured to recover a first optical clock signal from the first optical signal or the first amplified optical signal.

6. The transceiver of claim 5, wherein the optical-to-optical signal path further comprises a first optical gate configured to (i) receive the first optical clock signal and the first amplified optical signal and (ii) output the first optical clock signal or the first amplified optical signal in response to a first select signal.

7. The transceiver of claim 6, wherein the optical-to-optical signal path further comprises a first beam splitter configured to direct a portion of the first optical signal or the first amplified optical signal to the first optical clock recovery unit.

8. The transceiver of claim 6, further comprising a phase adjustment unit between the optical gate and the optical clock recovery unit, configured to adjust a phase of the first optical clock signal.

9. An optical or optoelectronic transceiver, comprising a receiver, a transmitter and a housing, wherein at least one of the receiver and the transmitter comprises an optical-to-optical signal path comprising:
   a) first and second ports;
   b) a first optical amplifier configured to receive a first optical signal from one of a host and a network through the first port and provide a first amplified optical signal for the other of the host and the network through the second port; and
   c) a first optical clock recovery unit configured to recover a first optical clock signal from the first optical signal or the first amplified optical signal,
   wherein the housing is configured to contain the receiver and the transmitter, and the first optical clock signal has a wavelength different from that of the first optical signal and/or one or more fiber transmission properties different from those of the first optical signal or the first amplified optical signal.

10. The transceiver of claim 9, wherein the receiver comprises the optical-to-optical signal path, the first optical amplifier receives the first optical signal from the host, the transmitter comprises a second optical-to-optical signal path, and the second optical-to-optical signal path comprising a second optical amplifier configured to receive a second optical signal from the network.

11. An optical or optoelectronic transceiver, comprising a receiver, a transmitter and a housing, wherein:
   the receiver comprises a first optical-to-optical signal path comprising (i) first and second ports and (ii) a first optical amplifier configured to receive a first optical signal from a host through the first port and provide a first amplified optical signal for a network through the second port;
   the transmitter comprises a second optical-to-optical signal path that comprises a first optical isolator configured to receive and optically isolate a second optical signal from the network, a second optical amplifier configured to receive the second optical signal from the first optical isolator and provide a second amplified optical signal, and a second optical isolator configured to optically isolate the second amplified optical signal and provide the second amplified optical signal to the network; and the housing is configured to contain the receiver and the transmitter.

12. The transceiver of claim 9, wherein one of the receiver and the transmitter comprises the optical-to-optical signal path, the other of the receiver and the transmitter comprises an optoelectronic signal path configured to receive an input signal from the other of the host or the network through a third port and provide an output signal to the one of the host and the network through a fourth port, the input signal is one of a first electrical signal and a second optical signal, and the output signal is (i) a third optical signal when the input signal is the first electrical signal and (ii) the third optical signal or a second electrical signal when the input signal is the second optical signal.

13. The transceiver of claim 12, wherein the receiver comprises the optical-to-optical signal path, the first optical amplifier receives the first optical signal from the network through the first port, and the transmitter comprises an electrical-to-optical signal path including (i) a driver configured to receive the first electrical signal from the host through the third port and provide a driving signal to a transmitter optical subassembly (TOSA) and (ii) a laser in the TOSA configured to output the third optical signal to the network through the fourth port.

14. The transceiver of claim 12, wherein the transmitter comprises the optical-to-optical signal path, the first optical amplifier receives the first optical signal from the host through the first port, and the receiver comprises an optical-to-electrical signal path including (i) a photodiode configured to convert the second optical signal from the network to the second electrical signal and (ii) an amplifier configured to amplify the second electrical signal and output an amplified second electrical signal to the host through the fourth port.

15. The transceiver of claim 9, wherein one of the receiver and the transmitter comprises the optical-to-optical signal path and the other of the receiver and the transmitter comprises an optical-to-electrical-to-optical signal path configured to receive a fourth optical signal from the other of the host or the network through the third port and provide a fifth optical signal to the one of the host and the network through a fourth port.

16. An optical or optoelectronic transceiver, comprising a receiver, a transmitter and a housing, wherein:

the receiver comprises an optical-to-optical signal path comprising (i) first and second ports and (ii) a first optical amplifier configured to receive a first optical signal from a network through the first port and provide a first amplified optical signal for a host through the second port, the transmitter comprises an optical-to-electrical-to-optical signal path, including (i) an optical-to-electrical converter configured to receive a second optical signal from the host through a third port, (ii) a signal processor configured to process a first electrical signal from the optical-to-electrical converter, and (iii) an electrical-to-optical converter configured to convert the first electrical signal to a third optical signal, and the housing is configured to contain the receiver and the transmitter.

17. An optical or optoelectronic transceiver, comprising a receiver, a transmitter and a housing, wherein:

the transmitter comprises an optical-to-optical signal path comprising (i) first and second ports and (ii) a first optical amplifier configured to receive a first optical signal from a host through the first port and provide a first amplified optical signal for a network through the second port, and the receiver comprises an optical-to-electrical-to-optical signal path including (i) an optical-to-electrical converter configured to receive a second optical signal from the network through a third port, (ii) a signal processor configured to process an electrical signal from the optical-to-electrical converter, and (iii) an electrical-to-optical converter configured to convert the electrical signal to a third optical signal, and the housing is configured to contain the receiver and the transmitter.

18. The transceiver of claim 9, wherein one of the receiver and the transmitter comprises the optical-to-optical signal path and the other of the receiver and the transmitter comprises a pass-through connector configured to receive a sixth optical signal from the other of the host or the network through a third port and provide the sixth optical signal to the one of the host and the network through a fourth port.

19. An optical module, comprising:
a) a plurality of the transceivers of claim 1;
b) a housing configured to secure the plurality of transceivers in place.

20. The optical module of claim 19, wherein the housing has at least one opening therein configured to allow an optical fiber or optical waveguide to pass from a host port to each of the transceivers in the optical module.

21. A method of processing an optical signal, comprising:
a) receiving, in an optical-to-optical signal path in an optical or optoelectronic transceiver, the optical signal from one of a host and a network;
b) after receiving the optical signal, optically isolating the optical signal;
c) amplifying the optical signal after optically isolating the optical signal;
d) filtering the amplified optical signal;
e) after filtering the amplified optical signal, optically isolating the optical signal again; and
f) transmitting the filtered, amplified optical signal to the other of the host and the network after optically isolating the optical signal again.

22. The method of claim 21, further comprising:
a) prior to amplifying the optical signal, splitting or separating a portion of the optical signal;
b) recovering an optical clock signal from the portion of the optical signal; and
c) transmitting the optical clock signal instead of the amplified optical signal based on a value of the optical signal.

23. A method of manufacturing a transceiver having an optical-to-optical signal path, the method comprising:
a) mounting, affixing or securing first, second, third and fourth ports to a housing of the transceiver, a first path from the first port to the second port defining the optical-to-optical signal path, and a second path from the third port to the fourth port defining an optoelectronic signal path; and
b) mounting, affixing or securing a first optical amplifier to a first internal surface of the transceiver along the optical-to-optical signal path,
wherein the first port is configured to receive a first optical signal from one of a host and a network, the first optical amplifier is configured to amplify the first optical signal, the second port is configured to provide the amplified first optical signal to the other of the host and the network, the optoelectronic signal path is configured to (i) receive an input signal from the other of the host or the network through the third port and (ii) provide an output signal to the one of the host and the network through the fourth port, the input signal is one of a first electrical signal and a second optical signal, and the output signal is (i) a third optical signal when the input signal is the first electrical signal and (ii) the third optical signal or a second electrical signal when the input signal is the second optical signal.

24. The method of claim 23, further comprising mounting, affixing or securing a first optical filter to a second internal surface of the transceiver along the optical-to-optical signal path, wherein the first optical filter is configured to filter the amplified first optical signal from the first optical amplifier.

25. The method of claim 24, further comprising:
a) mounting, affixing or securing a second optical amplifier to a third internal surface of the transceiver along a second optical-to-optical signal path, wherein the second optical amplifier is configured to amplify a second optical signal from the other of the host and the network through a third port; and
b) mounting, affixing or securing a second optical filter to a fourth internal surface of the transceiver along the second optical-to-optical signal path, wherein the second optical filter is configured to filter the amplified second optical signal from the second optical amplifier and provide the filtered, amplified second optical signal to the one of the host and the network through a fourth port, wherein the third and fourth ports define a second optical-to-optical signal path.

26. The method of claim 24, further comprising:
a) mounting, affixing or securing a first isolator to a fifth internal surface of the transceiver along the optical-to-optical signal path, wherein the first isolator is configured to optically isolate the first optical signal prior to the first optical amplifier amplifying the first optical signal; and
b) mounting, affixing or securing a second isolator to a sixth internal surface of the transceiver along the optical-to-optical signal path, wherein the second isolator is configured to optically isolate the filtered, amplified first optical signal.

27. The method of claim 26, further comprising:
a) mounting, affixing or securing a first beam splitter to a seventh internal surface of the transceiver along the optical-to-optical signal path, wherein the first beam splitter is configured to split or separate a portion of the first optical signal prior to the first optical amplifier amplifying the first optical signal;
b) mounting, affixing or securing a first optical clock recovery unit to an eighth internal surface of the transceiver, wherein the first optical clock recovery unit is configured to recover a first optical clock signal from the portion of the first optical signal;
c) mounting, affixing or securing a first optical gate to a ninth internal surface of the transceiver along the optical-to-optical signal path, wherein the first optical gate is configured to select a first optical output signal from the first optical clock signal or the filtered, amplified first optical signal based on a value of the first optical signal.

28. The method of claim 26, further comprising mounting, affixing or securing two or more components of the optoelectronic signal path between the third port and the fourth port of the transceiver, wherein a first one of the two or more components of the optoelectronic signal path is configured to receive the input signal from the other of the host or the network through the third port, and a second one of the two or more components of the optoelectronic signal path is configured to provide the output signal to the one of the host and the network through the fourth port.

29. The method of claim 21, further comprising:
a) receiving, in a second optical-to-optical signal path in the optical or optoelectronic transceiver, a second optical signal from the other of the host and the network;
b) amplifying the second optical signal; and
c) transmitting the amplified second optical signal to the one of the host and the network.

30. The method of claim 29, further comprising filtering the second amplified optical signal, wherein the filtered, amplified second optical signal is transmitted to the one of the host and the network.

31. The method of claim 29, further comprising:
a) optically isolating the second optical signal after receiving the second optical signal and prior to amplifying the second optical signal; and
b) optically isolating the second optical signal again after filtering the amplified second optical signal and prior to transmitting the filtered, amplified second optical signal.

32. The transceiver of claim 16, wherein the optical-to-optical signal path further comprises a first optical filter configured to filter the first amplified optical signal and provide the first amplified optical signal for the other of the host and the network through the second port.

33. The transceiver of claim 32, wherein the optical-to-optical signal path further comprises a first optical isolator configured to optically isolate the first amplified optical signal and provide the optically isolated first amplified optical signal to the other of the host and the network.

34. The transceiver of claim 33, wherein the optical-to-optical signal path further comprises a second optical isolator configured to (i) optically isolate the first optical signal from the one of the host and the network and (ii) provide the optically isolated first optical signal to the first optical amplifier.

35. The transceiver of claim 17, wherein the optical-to-optical signal path further comprises a first optical filter configured to filter the first amplified optical signal from the first optical amplifier and provide the first amplified optical signal for the other of the host and the network through the second port.

36. The transceiver of claim 35, wherein the optical-to-optical signal path further comprises a first optical isolator configured to optically isolate the first amplified optical signal and provide the optically isolated first amplified optical signal to the other of the host and the network.

37. The transceiver of claim 36, wherein the optical-to-optical signal path further comprises a second optical isolator configured to (i) optically isolate the first optical signal from the one of the host and the network and (ii) provide the optically isolated first optical signal to the first optical amplifier.

* * * * *